US012469986B2

(12) United States Patent
Tezuka et al.

(10) Patent No.: US 12,469,986 B2
(45) Date of Patent: Nov. 11, 2025

(54) ANTENNA DEVICE AND ANTENNA MODULE

(71) Applicant: TDK Corporation, Tokyo (JP)

(72) Inventors: Kenichi Tezuka, Tokyo (JP); Yasuharu Miyauchi, Tokyo (JP); Yousuke Futamata, Tokyo (JP); Misaki Tabata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 78 days.

(21) Appl. No.: 18/619,654

(22) Filed: Mar. 28, 2024

(65) Prior Publication Data

US 2024/0332823 A1 Oct. 3, 2024

(30) Foreign Application Priority Data

Mar. 31, 2023 (JP) ................................ 2023-057699

(51) Int. Cl.
*H01Q 21/28* (2006.01)
*H01Q 1/38* (2006.01)
*H01Q 1/50* (2006.01)

(52) U.S. Cl.
CPC .............. *H01Q 21/28* (2013.01); *H01Q 1/38* (2013.01); *H01Q 1/50* (2013.01)

(58) Field of Classification Search
CPC ........ H01Q 21/28; H01Q 21/065; H01Q 1/50; H01Q 9/0407; H01Q 19/106; H01Q 1/38
See application file for complete search history.

(56) References Cited

U.S. PATENT DOCUMENTS

| | | | |
|---|---|---|---|
| 2019/0166686 A1 | 5/2019 | Jo et al. | |
| 2022/0216590 A1 | 7/2022 | Yamakawa et al. | |

FOREIGN PATENT DOCUMENTS

| | | | | |
|---|---|---|---|---|
| JP | 2021197681 A | * 12/2021 | | H01Q 23/00 |
| WO | 2019/054094 A1 | 3/2019 | | |
| WO | 2021/059738 A1 | 4/2021 | | |

* cited by examiner

*Primary Examiner* — Hoang V Nguyen
(74) *Attorney, Agent, or Firm* — Oliff PLC

(57) ABSTRACT

An antenna device includes: a dielectric layer; radiation conductors and a ground conductor disposed at the dielectric layer; and side surface conductors in which a plurality of conductor patterns are laminated, the side surface conductors are disposed on an outer side of the ground conductors in a first direction in plan view seen from a normal direction of the radiation conductors, and the dimensions of the side surface conductors in a second direction perpendicular to the first direction are larger than the dimensions in the second direction of the radiation conductors.

10 Claims, 21 Drawing Sheets

ANTENNA DEVICE AND ANTENNA MODULE

CROSS REFERENCE TO RELATED APPLICATIONS

This application claims priority to Japanese Patent Application No. 2023-057699 filed on Mar. 31, 2023, the entire contents of which are incorporated by reference herein.

TECHNICAL FIELD

The present disclosure relates to an antenna device and an antenna module.

BACKGROUND

Conventionally, there is known an antenna device described in International Publication WO 2019/054094 A as antenna devices. This antenna device includes radiation conductors disposed inside a dielectric layer and a plurality of columnar conductors disposed around the radiation conductor.

SUMMARY

An antenna device according to one aspect of the present disclosure includes a dielectric layer; a radiation conductor and a ground conductor disposed at the dielectric layer; and a side surface conductor in which a plurality of conductor patterns are laminated, the side surface conductor is disposed on an outer side of the ground conductor in a first direction in plan view seen from a normal direction of the radiation conductor, and a dimension of the side surface conductor in a second direction perpendicular to the first direction is larger than a dimension of the radiation conductor in the second direction.

DETAILED DESCRIPTION

Here, the above-described antenna device has been required to improve radiation efficiency of signals to be radiated from the radiation conductors.

It is therefore an object of the present disclosure is to provide an antenna device that can improve radiation efficiency, and an antenna module.

According to one aspect of the present disclosure, it is possible to provide an antenna device that can improve radiation efficiency, and an antenna module.

Hereinafter, an embodiment of the present disclosure will be described in detail. However, the present disclosure is not limited to the following embodiment.

Figure 1:
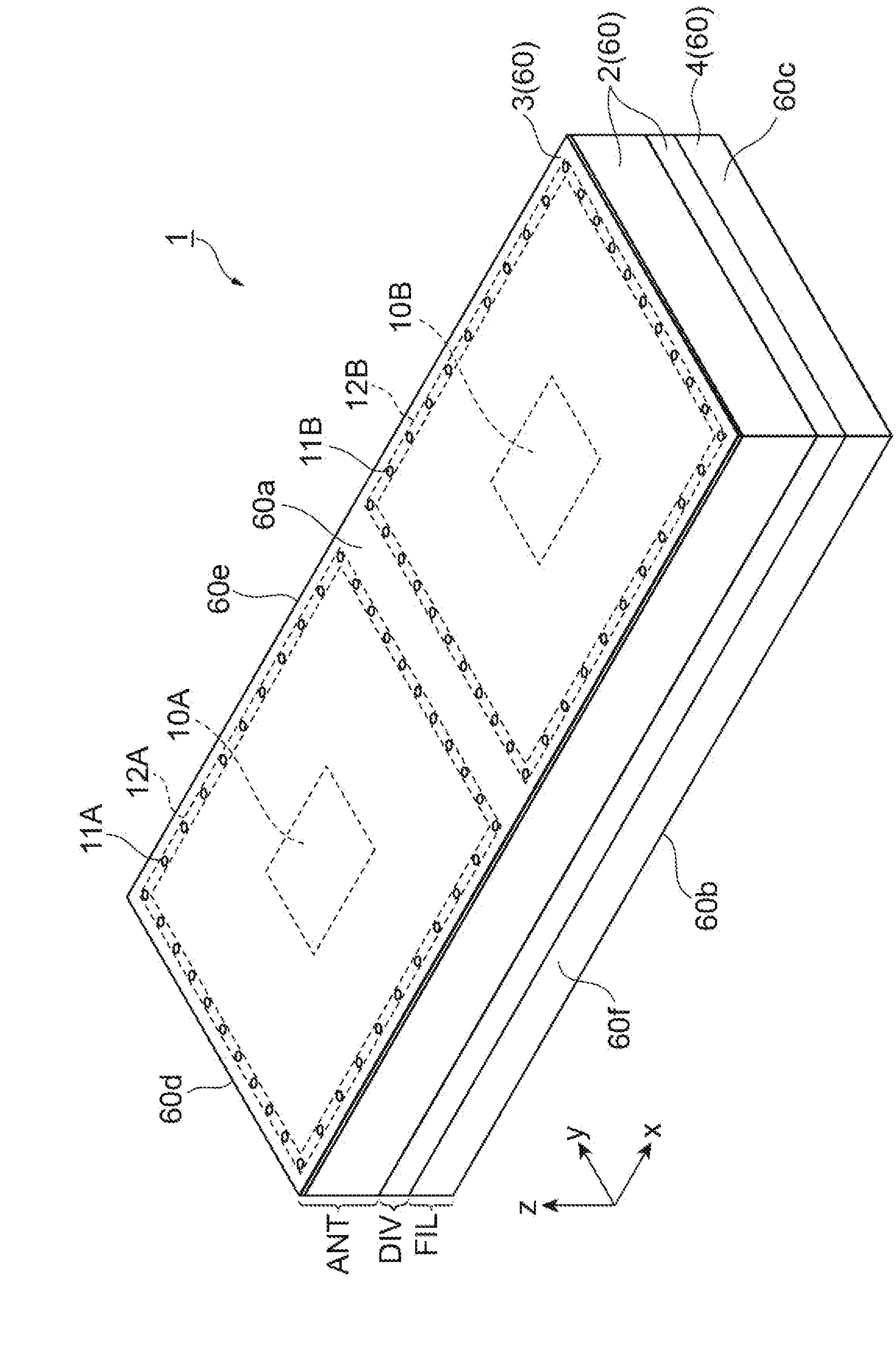
FIG. 1 is a schematic perspective view illustrating the external appearance of an antenna device according to an embodiment of the present disclosure.
Figure 2:
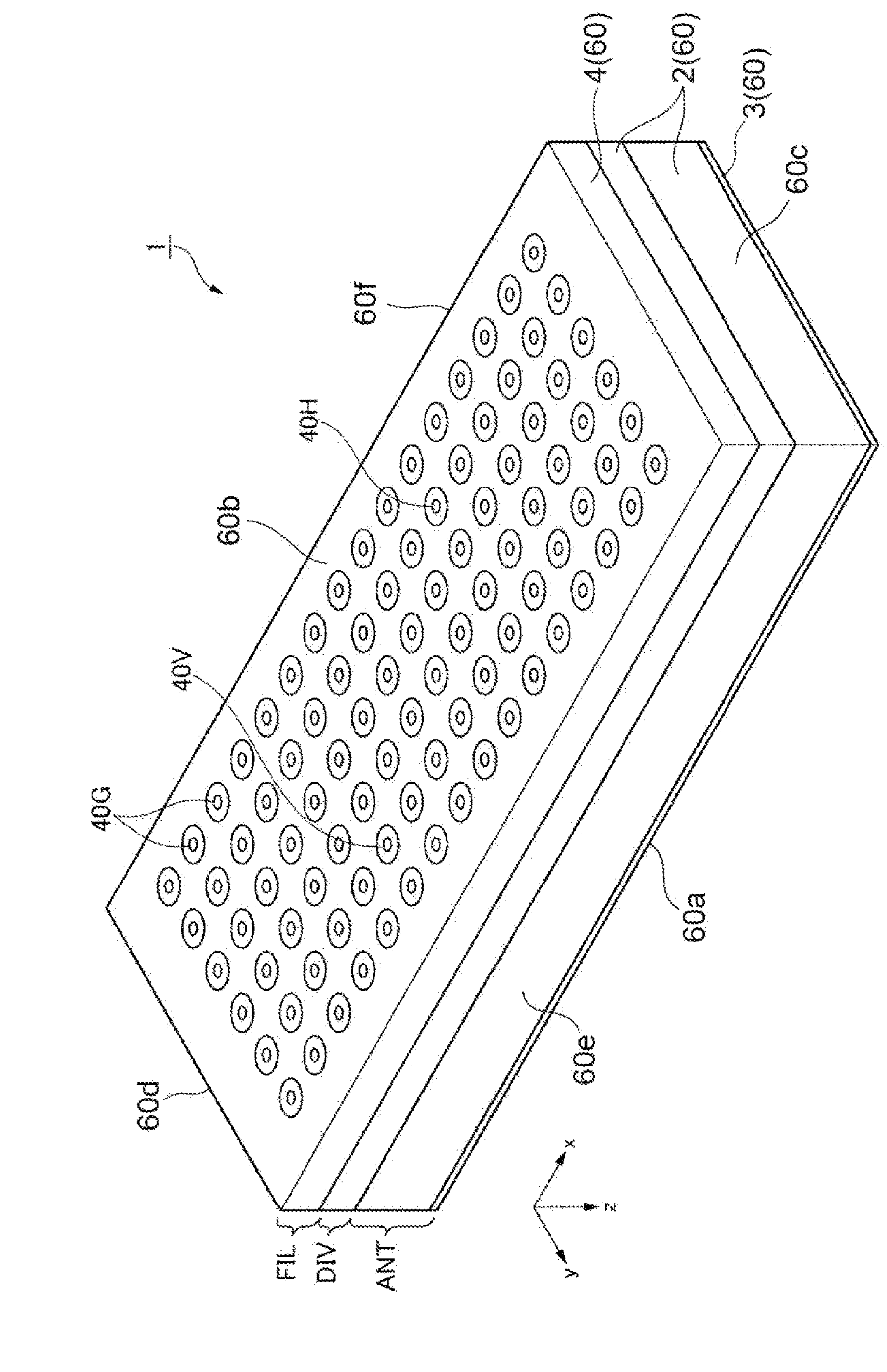
FIG. 2 is a schematic perspective view illustrating the external appearance of the antenna device according to the embodiment of the present disclosure.
Figure 3:
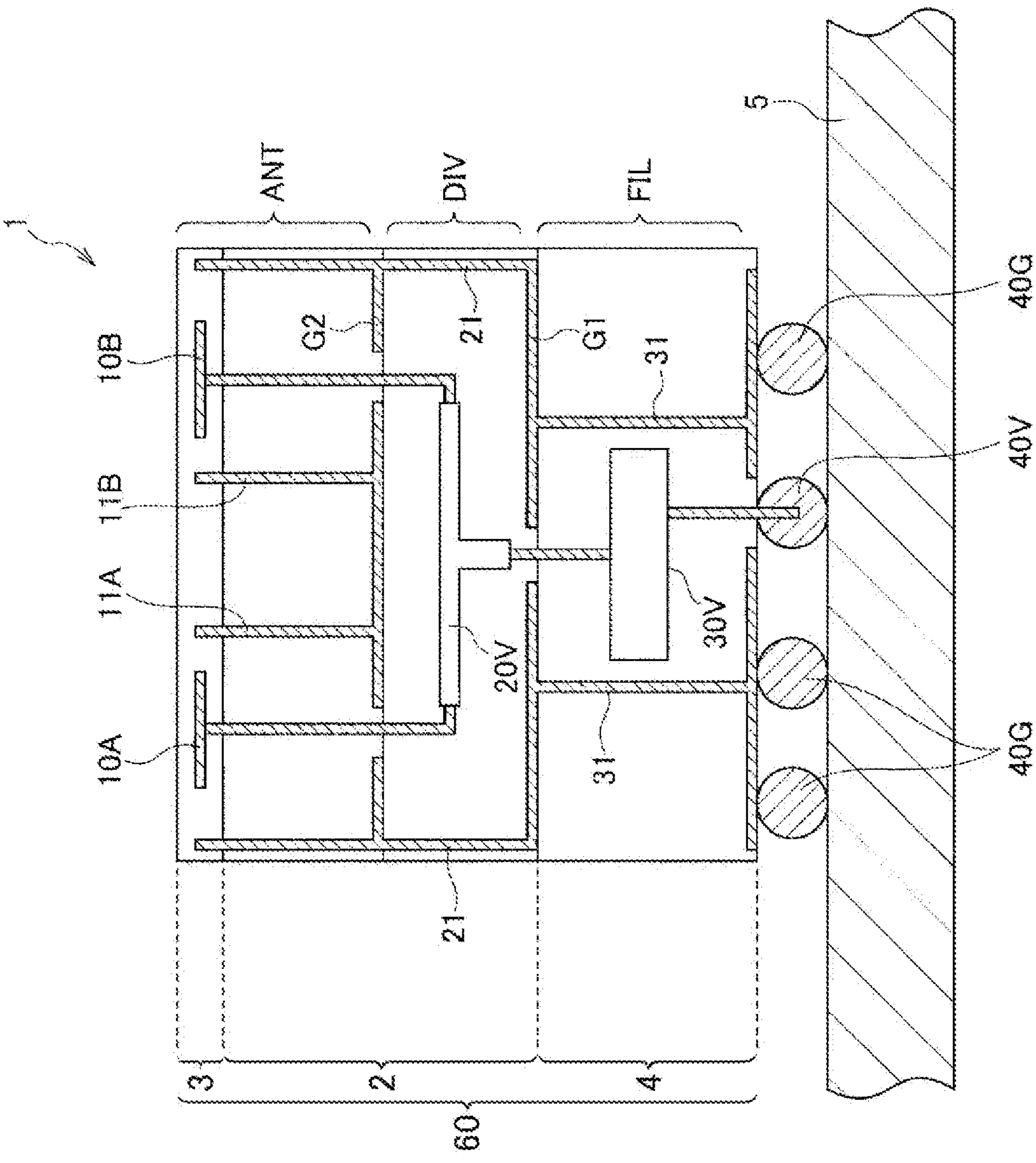
FIG. 3 is a schematic view for describing an internal structure of the antenna device according to the present embodiment.
Figure 4:
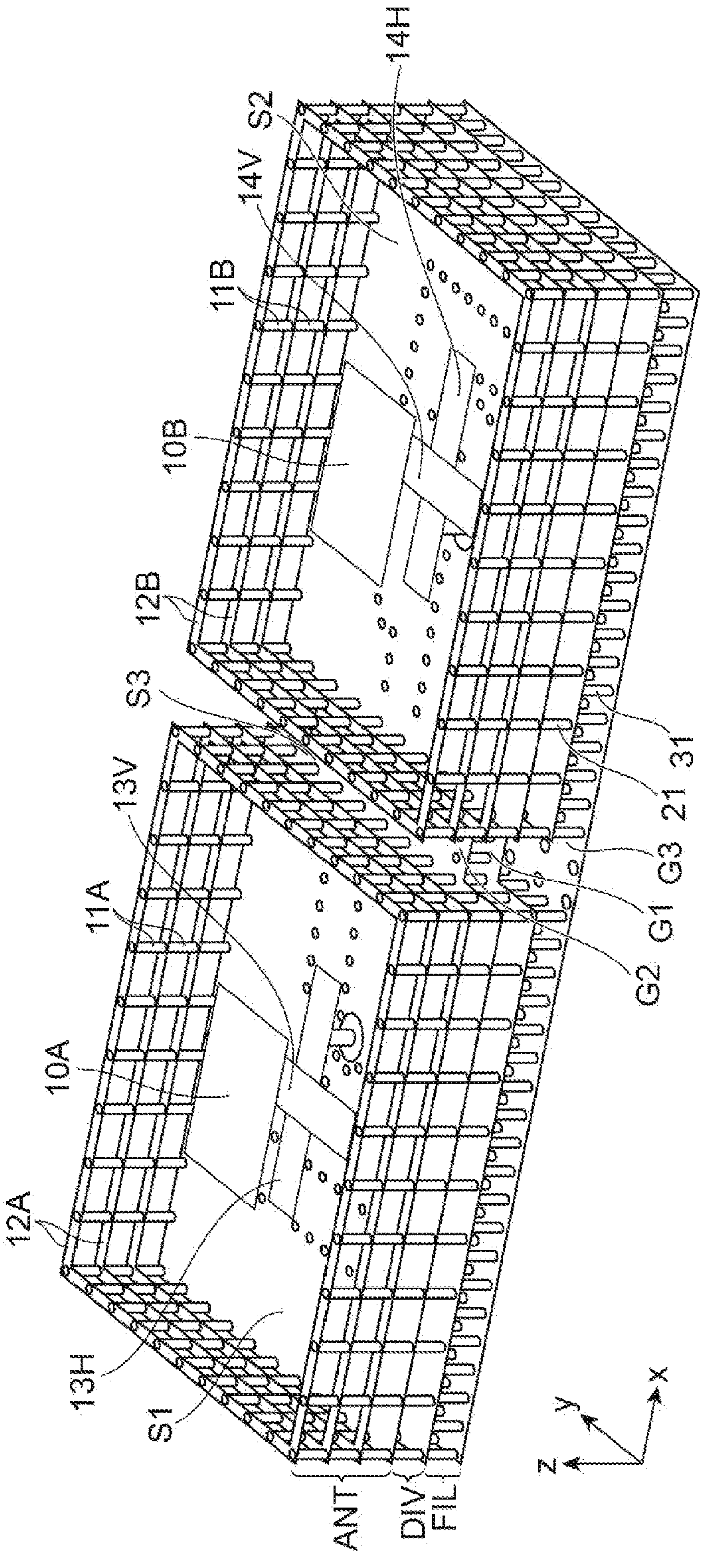
FIG. 4 is a schematic perspective view illustrating a state where dielectric layers are removed from the antenna device.

FIG. 1 is a schematic perspective view illustrating the external appearance of an antenna device 1 according to the embodiment of the present disclosure, and illustrates a state seen from a radiation surface side. FIG. 2 is a schematic perspective view illustrating the external appearance of the antenna device 1 according to the embodiment of the present disclosure, and illustrates a state seen from a mounting surface side. FIG. 3 is a schematic view for describing the internal structure of the antenna device 1, and schematically illustrates a state where the antenna device 1 is mounted on a motherboard 5. FIG. 4 is the schematic perspective view illustrating a state where dielectric layers 2 to 4 are removed from the antenna device 1.

Hereinafter, the embodiment of the present disclosure will be described in detail with reference to the accompanying drawings.

FIGS. 1 and 2 are the schematic perspective views illustrating the external appearance of the antenna device 1 according to the embodiment of the present disclosure, FIG. 1 illustrates the state seen from the radiation surface side, and FIG. 2 illustrates the state seen from the mounting surface side.

As illustrated in FIGS. 1 and 2, the antenna device 1 according to the present embodiment includes a dielectric layer 60. The dielectric layer 60 includes the first dielectric layer 2, the second dielectric layer 3, and the third dielectric layer 4. The third dielectric layer 4, the first dielectric layer 2, and the second dielectric layer 3 are laminated in this order from the negative side to the positive side in a z direction. The dielectric layer 60 has a rectangular parallelepiped shape having a longitudinal direction in an X axis direction. The dielectric layer 60 includes a top surface 60*a*, a bottom surface 60*b*, end surfaces 60*c* and 60*d*, and side surfaces 60*e* and 60*f*. The top surface 60*a* and the bottom surface 60*b* oppose to each other in the z direction, the top surface 60*a* is disposed on the positive side in the z direction, and the bottom surface 60*b* is disposed on the negative side in the z direction. The end surfaces 60*c* and 60*d* oppose to each other in an x direction, the end surface 60*c* is disposed on the positive side in the x direction, and the end surface 60*d* is disposed on the negative side in the x direction. The side surfaces 60*e* and 60*f* oppose to each other in a y direction, the side surface 60*e* is disposed on the positive side in the y direction, and the side surface 60*f* is disposed on the negative side in the y direction.

The antenna device 1 includes an antenna layer ANT, a filter layer FIL, and a distribution layer DIV laminated between the filter layer FIL and the antenna layer ANT.

The antenna layer ANT includes the first dielectric layer 2, the second dielectric layer 3, and a radiation conductor 10. The radiation conductor 10 includes a radiation conductor 10A (first radiation conductor) and a radiation conductor 10B (second radiation conductor). In the example illustrated in FIG. 3, the radiation conductors 10A and 10B are disposed at the second dielectric layer 3. In this regard, the radiation conductors 10A and 10B may be disposed on the first dielectric layer 2 and covered with the second dielectric layer 3. Furthermore, the radiation conductors 10A and 10B may be disposed on the top surface of the second dielectric layer 3 that is the outermost surface of the dielectric layer 60. Furthermore, the antenna layer ANT includes a plurality of ground conductors 11A (columnar conductors) surrounding the radiation conductor 10A and a plurality of ground conductors 11B (columnar conductors) surrounding the radiation conductor 10B in plan view seen from a lamination direction (z direction) that is a normal direction of the radiation conductors 10A and 10B. The ground conductors 11A and 11B are columnar conductors that extend in the z direction so as to penetrate the first dielectric layer 2. The plurality of ground conductors 11A are connected to ring-shaped ground rings 12A on a predetermined xy plane, and the plurality of ground conductors 11B are connected to ring-shaped ground rings 12B on the predetermined xy plane. Power feeding conductors to be described later are provided in spaces surrounded by the plurality of ground conductors 11A and 11B. As described above, the ground conductors 11A are disposed around the radiation conductor 10A and power feeding conductors 13V and 13H. The ground conductors 11B are disposed around the radiation conductor 10B and power feeding conductors 14V and 14H. End parts on a positive side in the z direction of the plurality of ground conductors 11A and 11B are covered with the second dielectric layer 3.

The distribution layer DIV includes the first dielectric layer 2 and conductor patterns buried in the first dielectric layer 2. The filter layer FIL includes the third dielectric layer 4, and conductor patterns that are buried in the third dielectric layer 4. Details of the filter layer FIL and the distribution layer DIV will be described later. The filter layer FIL constitutes a mounting surface for the motherboard. Signal terminals 40V and 40H and a plurality of ground terminals 40G are provided on the mounting surface. The signal terminal 40V is a terminal for inputting/outputting a vertical polarization antenna signal, and the signal terminal 40H is a terminal for inputting/outputting a horizontal polarization antenna signal. A ground potential is applied to the ground terminals 40G.

FIG. 3 is the schematic view for describing the internal structure of the antenna device 1 according to the present embodiment, and schematically illustrates a state where the antenna device 1 is mounted on the motherboard 5.

As illustrated in FIG. 3, a ground conductor G1 is provided between the filter layer FIL and the distribution layer DIV, and a ground conductor G2 is provided between the distribution layer DIV and the antenna layer ANT. The ground conductor G1 is provided at an interface between the third dielectric layer 4 and the first dielectric layer 2. The ground conductor G2 is buried in the first dielectric layer 2.

The filter layer FIL is provided with a filter circuit pattern 30V. The filter circuit pattern 30V is a band-pass filter, and is connected to the signal terminals 40V. The filter circuit pattern 30V is surrounded by a plurality of ground conductors 31 in plan view seen from the lamination direction. The ground conductors 31 (columnar conductors) are columnar conductors that extend in the z direction so as to penetrate the third dielectric layer 4. Although not illustrated in FIG. 3, the filter layer FIL also includes another filter circuit pattern that is connected to the signal terminals 40H.

The distribution layer DIV is provided with a distribution circuit pattern 20V. The distribution circuit pattern 20V is a circuit that distributes to the radiation conductors 10A and 10B an antenna signal fed from the filter circuit pattern 30V. The distribution circuit pattern 20V is surrounded by a plurality of ground conductors 21 (columnar conductors) in plan view seen from the lamination direction. The ground conductors 21 are the columnar conductors that extend in the z direction so as to penetrate the first dielectric layer 2. Although not illustrated in FIG. 3, the distribution layer DIV also includes another distribution circuit pattern that is connected to another filter circuit pattern. The first dielectric layer 2 includes the distribution circuit pattern 20V between the power feeding conductors 13V and 13H and the power feeding conductors 14V and 14H described later, and the third dielectric layer 4.

FIG. 4 is the schematic perspective view illustrating a state where the dielectric layers 2 to 4 are removed from the antenna device 1.

As illustrated in FIG. 4, the power feeding conductors 13V and 13H (first power feeding conductors) that overlap the radiation conductor 10A seen from the z direction are provided in the space surrounded by the plurality of ground conductors 11A. The power feeding conductors 13V and 13H are coupled with the radiation conductor 10A. The first dielectric layer 2 includes the power feeding conductors 13V and 13H. Among these conductors, the power feeding conductor 13V is a conductor pattern whose longitudinal direction is the y direction, and supplies a vertical polarization antenna signal SV to the radiation conductor 10A. On the other hand, the power feeding conductor 13H is a conductor pattern whose longitudinal direction is the x direction, and supplies a horizontal polarization antenna signal SH to the radiation conductor 10A. The power feeding conductors 13V and 13H are located close to one end part of the conductor patterns, and receive supply of the antenna signals via the filter circuit pattern 30V and the distribution circuit pattern 20V (see FIG. 3). Hence, a power feeding position of the power feeding conductor 13V for the radiation conductor 10A differs from a power feeding position of the power feeding conductor 13H for the radiation conductor 10A by 90°.

Similarly, the power feeding conductors 14V and 14H (second power feeding conductors) that overlap the radiation conductor 10B seen from the z direction are provided in the space surrounded by the plurality of ground conductors 11B. The power feeding conductors 14V and 14H are coupled with the radiation conductor 10B. The first dielectric layer 2 includes the power feeding conductors 14V and 14H. Among these conductors, the power feeding conductor 14V is a conductor pattern whose longitudinal direction is the y direction, and supplies the vertical polarization antenna signal SV to the radiation conductor 10B. On the other hand, the power feeding conductor 14H is a conductor pattern whose longitudinal direction is the x direction, and supplies the horizontal polarization antenna signal SH to the radiation conductor 10B. The power feeding conductors 14V and 14H are located at positions close to one end parts of the conductor patterns, and receive supply of the antenna signals via the filter circuit pattern 30 and the distribution circuit pattern 20V (see FIG. 3). Hence, a power feeding position of the power feeding conductor 14V for the radiation conductor 10B differs from a power feeding position of the power feeding conductor 14H for the radiation conductor 10B by 90°.

Ground conductors G1 to G3 of large areas are provided below the antenna layer ANT. The ground conductors G1 to G3 are disposed closer to a negative side in a z axis direction than the power feeding conductors 13V and 13H and the power feeding conductors 14V and 14H. A region sandwiched between the ground conductor G1 and the ground conductor G2 is the distribution layer DIV. The ground conductor G1 and the ground conductor G2 are connected by the plurality of ground conductors 21. Here, in plan view seen from the z direction, each of the ground conductors G1 and G2 includes a region S1 that overlaps the space surrounded by the plurality of ground conductors 11A, a region S2 that overlaps the space surrounded by the plurality of ground conductors 11B, and a region S3 that connects the region S1 and the region S2. Furthermore, the width of the region S3 in the y direction is narrower than the widths of the regions S1 and S2 in the y direction. Consequently, mutual interference between the radiation conductors 10A and 10B via the ground conductors G1 and G2 is reduced, so that it is possible to enhance independence of the radiation conductor 10A and the radiation conductor 10B.

A region sandwiched between the ground conductor G1 and the ground conductor G3 is the filter layer FIL. The ground conductor G1 and the ground conductor G3 are connected by the plurality of ground conductors 31 (columnar conductors). The width of the ground conductor G3 in the y direction may be fixed.

Figure 5:
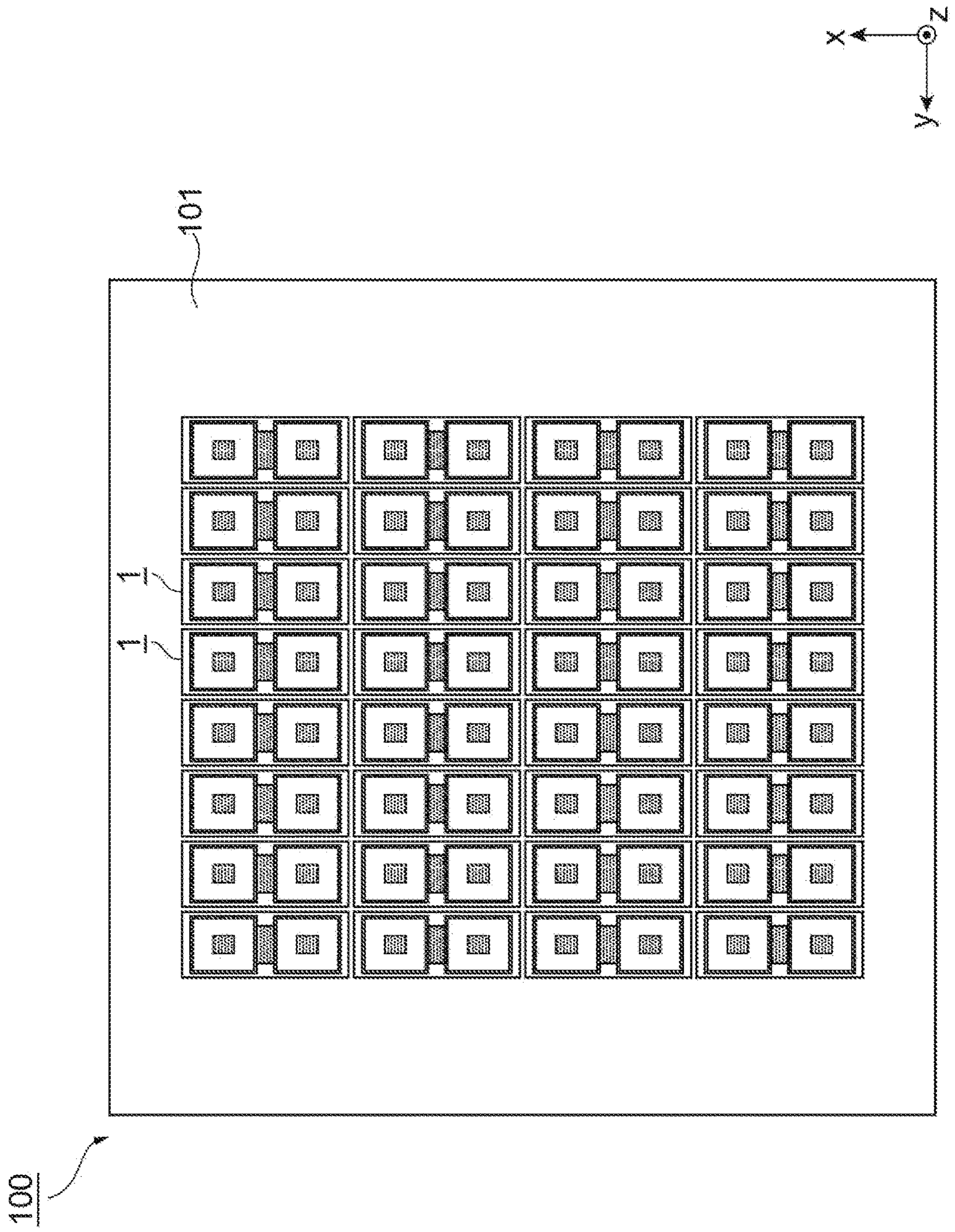
FIG. 5 is a plan view illustrating an antenna module.

As illustrated in FIG. 5, an antenna module 100 includes a plurality of the antenna devices 1. The antenna module 100 is provided by aligning the plurality of antenna devices 1 on a substrate 101. In an example illustrated in FIG. 5, the eight antenna devices 1 are aligned in the y direction and the four eight antenna devices 1 are aligned in the x direction. However, the number of the antenna devices 1 of the antenna module 100 is not particularly limited.

Figures 6A, 6B, 6C:
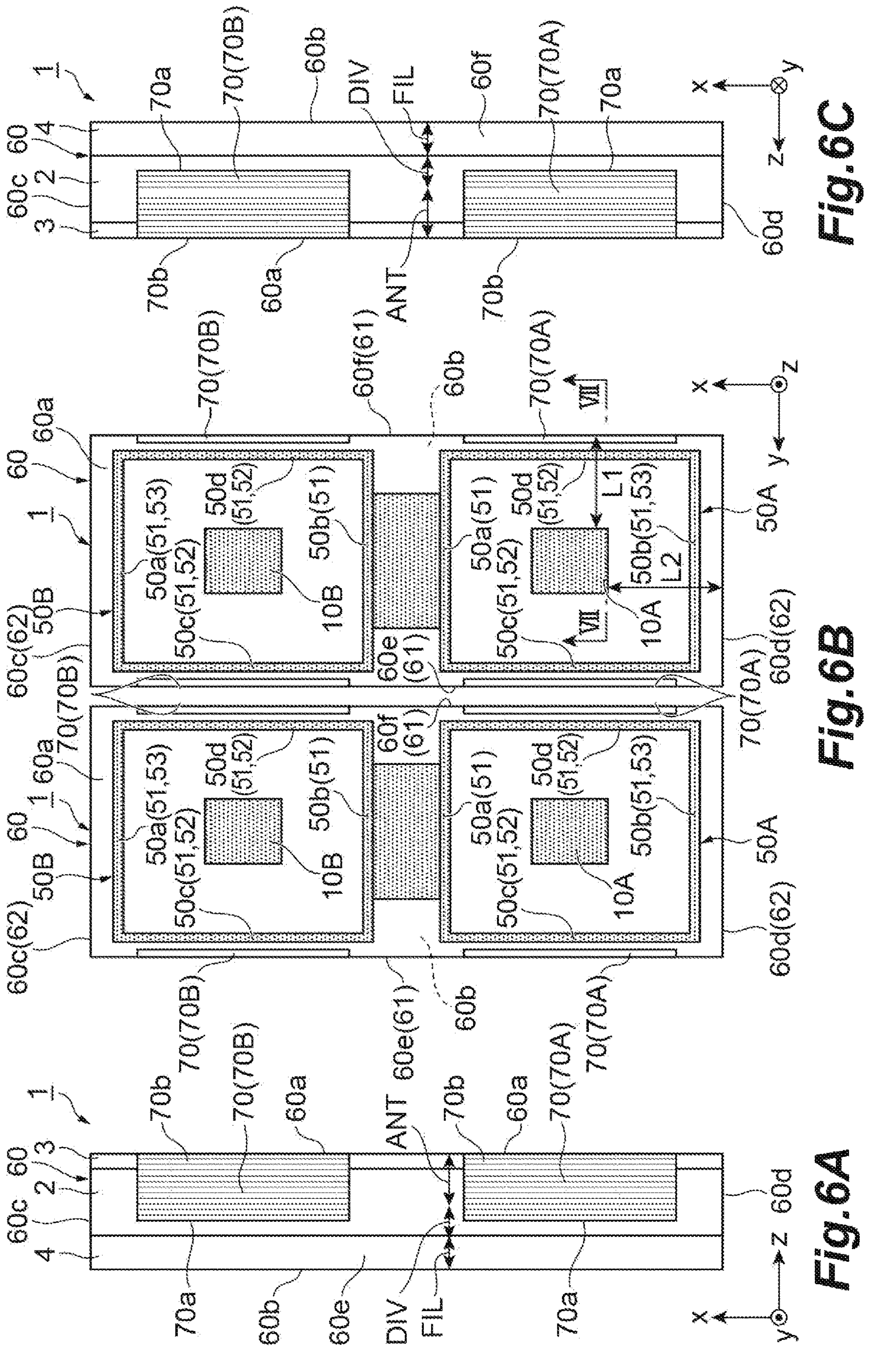
FIGS. 6A to 6C are views each illustrating the antenna device.

Next, a more detailed configuration of the antenna devices 1 aligned in the antenna module 100 will be described together with a positional relationship with the other antenna device 1 with reference to FIGS. 6A to 6C. FIGS. 6A to 6C illustrate the two antenna devices 1 aligned adjacent to each other in a Y axis direction. FIG. 6A is a side view of the alignment of the antenna devices 1 seen from the positive side in the y direction. FIG. 6B is a plan view of the alignment of the antenna devices 1 seen from the positive side in the z direction. FIG. 6C is a side view of the alignment of the antenna devices 1 seen from the negative side in the y direction.

FIG. 6B illustrates the above-described radiation conductors 10A and 10B. Furthermore, FIG. 6B illustrates ground conductors 50A and 50B disposed around the radiation conductors 10A and 10B. The ground conductor 50A includes the ground conductors 11A, 21, and 31 that are a plurality of columnar conductors disposed around the radiation conductor 10A, and the ground rings 12A. The ground conductor 50A includes the ground conductors 11A, 21, and 31 that are a plurality of columnar conductors disposed around the radiation conductor 10A, and the ground rings 12A (see FIG. 4). The ground conductor 50B includes the ground conductors 11B, 21, and 31 that are a plurality of columnar conductors disposed around the radiation conductor 10B, and the ground rings 12B (see FIG. 4). Note that the ground conductors 11A, 11B, 21, and 31 may be collectively referred to as columnar conductors 51.

The ground conductors 50A and 50B have side parts 50*a*, 50*b*, 50*c*, and 50*d* that surround the radiation conductors 10A and 10B from four sides. The side part 50*a* extends in the y direction on the positive side in the x direction. The side part 50*b* extends in the y direction on the negative side in the x direction. The side part 50*c* extends in the x direction on the positive side in the y direction. The side part 50*d* extends in the x direction on the negative side in the y direction. Each of the side parts 50*a*, 50*b*, 50*c*, and 50*d* includes a plurality of the columnar conductors 51 aligned in a direction in which each of the side parts 50*a*, 50*b*, 50*c*, and 50*d* extends in plan view. As described above, the ground conductors 50A and 50B include the plurality of columnar conductors 51 disposed around the radiation conductors 10A and 10B.

The plurality of columnar conductors 51 of the ground conductor 50A include a plurality of first columnar conductors 52 disposed between first end parts 61 of the dielectric layer 60 in the y direction (first direction) and the radiation conductor 10A. In the present embodiment, the side surfaces 60*e* and 60*f* correspond to the first end parts 61. The side parts 50*c* and 50*d* include the first columnar conductors 52. The plurality of columnar conductors 51 of the ground conductor 50A include a plurality of second columnar conductors 53 disposed between a second end part 62 of the dielectric layer 60 in the x direction (second direction) perpendicular to the y direction and the radiation conductor 10A. In the present embodiment, the end surface 60*d* corresponds to the second end part 62. The side part 50*b* includes the second columnar conductors 53.

The plurality of columnar conductors 51 of the ground conductor 50B include the plurality of first columnar conductors 52 disposed between the first end parts 61 of the dielectric layer 60 in the y direction (first direction) and the radiation conductor 10B. In the present embodiment, the side surfaces 60*e* and 60*f* correspond to the first end parts 61. The side parts 50*c* and 50*d* include the first columnar conductors 52. The plurality of columnar conductors 51 of the ground conductor 50B include a plurality of second columnar conductors 53 disposed between the second end part 62 of the dielectric layer 60 in the x direction (second direction) perpendicular to the y direction and the radiation conductor 10B. In the present embodiment, the end surface 60*c* corresponds to the second end part 62. The side part 50*a* includes the second columnar conductors 53.

A distance between the radiation conductors 10A and 10B and the first end parts 61 of the dielectric layer 60 in the y direction is a first distance L1. In the present embodiment, a distance in the y direction between the radiation conductors 10A and 10B and the side surface 60*e* and a distance in the y direction between the radiation conductors 10A and 10B and the side surface 60*f* correspond to the first distance L1. A distance between the radiation conductors 10A and 10B and the second end parts 62 of the dielectric layer 60 in the x direction perpendicular to the y direction is the second distance L2. In the present embodiment, the distance in the x direction between the radiation conductor 10A and the end surface 60*d* corresponds to the second distance L2. Furthermore, the distance in the x direction between the radiation conductor 10B and the end surface 60*c* corresponds to the second distance L2. The first distance L1 between the radiation conductors 10A and 10B and the first end parts 61 of the dielectric layer 60 is shorter than the second distance L2 between the radiation conductors 10A and 10B and the second end parts 62 of the dielectric layer 60. More specifically, the first distance L1 may be set to 100 to 500 μm. The second distance L2 may be set to a dimension of 150% to 300% of the first distance L1.

In plan view seen from the normal direction (z direction) of the radiation conductors 10A and 10B, side surface conductors 70 are disposed on an outer side of the plurality of first columnar conductors 52 of the ground conductor 50. The side surface conductor 70 is disposed on the outer side of each of the plurality of first columnar conductors 52 on the positive side (one side) in the y direction, and the plurality of first columnar conductors 52 on the negative side (other side) in the y direction. More specifically, the side surface conductors 70 are disposed on the outer side on the positive side in the y direction with respect to the plurality of first columnar conductors 52 of the side part 50*c* on the positive side in the y direction. The side surface conductors 70 are disposed on the outer side on the negative side in the y direction with respect to the plurality of first columnar conductors 52 of the side part 50*d* on the negative side in the y direction. Here, the end part on the outer peripheral side of the ground conductor G2 extends to a position of the columnar conductors 51 (first columnar conductor 52) (see FIG. 7). Hence, the side surface conductors 70 are disposed on the outer side of the ground conductor G2 in the y direction in plan view seen from the normal direction of the radiation conductors 10A and 10B. Note that the side surface conductors 70 may be disposed on the outer side of the plurality of second columnar conductors 53. The side surface conductor 70 may be disposed on the outer side of each of the plurality of second columnar conductors 53 of the side part 50*b* on the negative side in the x direction among the plurality of columnar conductors 51 disposed around the radiation conductor 10A, and the plurality of second columnar conductors 53 of the side part 50*a* on the positive side in the x direction among the plurality of columnar conductors 51 disposed around the radiation conductor 10B.

The side surface conductor 70 includes first side surface conductors 70A and second side surface conductors 70B. The first side surface conductors 70A are located on the outer side of the plurality of first columnar conductors 52 disposed around the radiation conductor 10A. The second side surface conductors 70B are located on the outer side of the plurality of first columnar conductors 52 disposed around the radiation conductor 10B. The first side surface conductor 70A and the second side surface conductor 70B are spaced away from each other. The first side surface conductors 70A are disposed at positions meeting the radiation conductor 10A in the x direction. The second side surface conductors 70B are disposed at positions separated closer to the positive side in the x direction than the first side surface conductors 70A in the x direction. The second side surface conductors 70B are disposed at positions meeting the radiation conductor 10B in the x direction.

The side surface conductors 70 are disposed at positions along the side surfaces 60*e* and 60*f* inside the dielectric layer 60. The side surface conductors 70A and 70B on the positive side in the y direction are disposed at the positions along the side surface 60*e* inside the dielectric layer 60 (see FIG. 6A). The side surface conductors 70A and 70B on the negative side in the y direction are disposed at the positions along the side surface 60*f* inside the dielectric layer 60 (see FIG. 6C).

As illustrated in FIG. 6B, both edges of the side surface conductors 70A and 70B in the x direction are located on the inner side of the columnar conductors located at both ends of the plurality of first columnar conductors 52 in the x direction. The edges of the side surface conductors 70A and 70B on the positive side in the x direction are located closer to the negative side in the x direction than the end parts (the positions of the side parts 50*a*) of the side parts 50*c* and 50*d* of the ground conductors 50A and 50B on the positive side in the x direction. The edges of the side surface conductors 70A and 70B on the negative side in the x direction are located closer to the positive side in the x direction than the end parts (the positions of the side parts 50*b*) of the side parts 50*c* and 50*d* of the ground conductors 50A and 50B on the negative side in the x direction.

The dimensions of the side surface conductors 70A and 70B in the x direction are larger than the dimensions of the radiation conductors 10A and 10B in the x direction. Both edges of the side surface conductors 70A and 70B in the x direction are located on the outer side of the both ends of the radiation conductors 10A and 10B in the x direction. The edges of the side surface conductors 70A and 70B on the positive side in the x direction are located closer to the positive side in the x direction than the end parts of the radiation conductors 10A and 10B on the positive side in the x direction. The edges of the side surface conductors 70A and 70B on the negative side in the x direction are located closer to the negative side in the x direction than the end parts of the radiation conductors 10A and 10B on the negative side in the x direction. The dimensions of the side surface conductors 70A and 70B in the x direction may be ½ or more or ⅝ or more of the wavelength of a radio wave that propagates in the dielectric layer 60. Note that the wavelength of the radio wave that propagates in the dielectric layer 60 of the antenna device 1 may be in the range of 3 mm to 7 mm.

As illustrated in FIGS. 6A and 6C, edges 70*a* of the side surface conductors 70A and 70B on a lower side (the negative side in the z direction) in the normal direction of the radiation conductors 10A and 10B are spaced away from the bottom surface 60*b* of the dielectric layer 60 on a lower side in the normal direction. The edges of the side surface conductors 70A and 70B on the negative side in the z direction are disposed at positions spaced away from the bottom surface 60*b* of the dielectric layer 60 toward the positive side in the z direction. In the present embodiment, the edges of the side surface conductors 70A and 70B on the lower side (the negative in the z direction) in the normal direction of the radiation conductors 10A and 10B may overlap the distribution layer DIV on the side surfaces 60*e* and 60*f* of the dielectric layer 60.

The edges of the side surface conductors 70A and 70B on an upper side (the positive side in the z direction) in the normal direction of the radiation conductors 10A and 10B may coincide with or be spaced away from the top surface 60*a* of the dielectric layer 60 on an upper side in the normal direction. In the case where the edges are spaced away from the top surface 60*a*, the edges of the side surface conductors 70A and 70B on the positive side in the z direction are disposed at positions spaced away from the top surface 60*a* of the dielectric layer 60 toward the negative side in the z direction.

Figure 7:
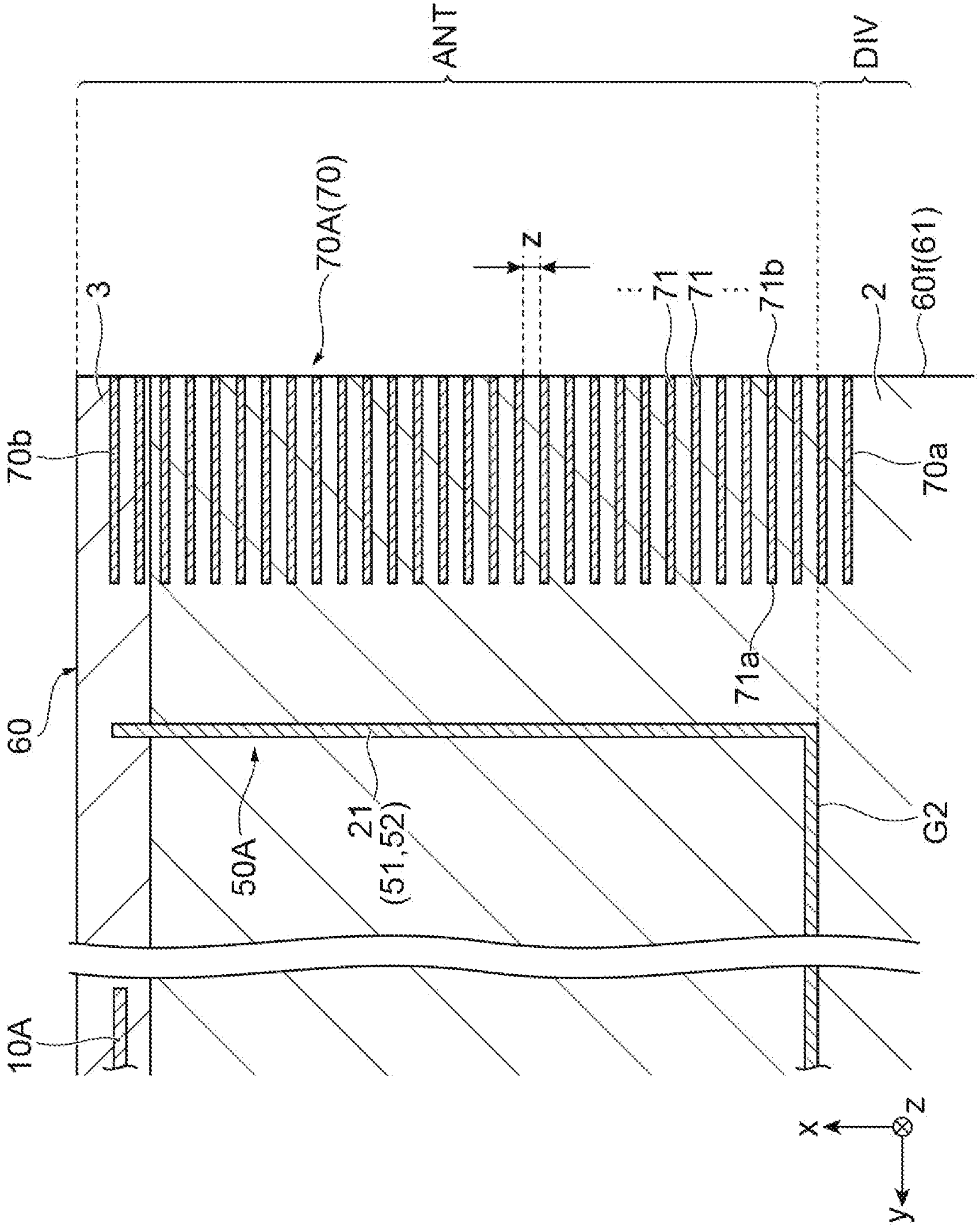
FIG. 7 is a cross-sectional view taken along line VII-VII in FIG. 6B.
Figure 8B:
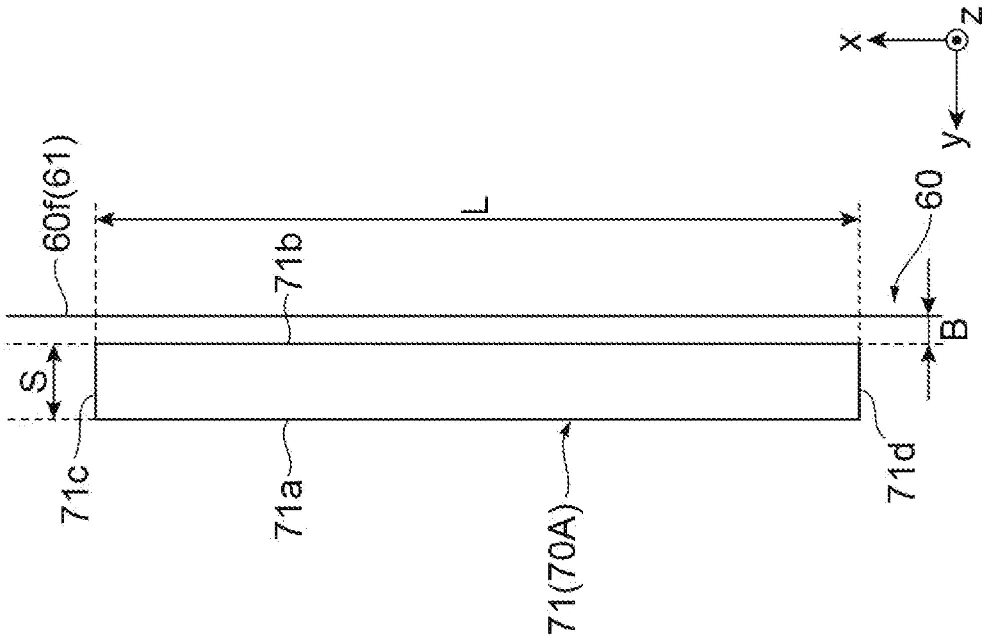
FIGS. 8A and 8B are plan views each illustrating a conductor pattern.
Figure 8A:
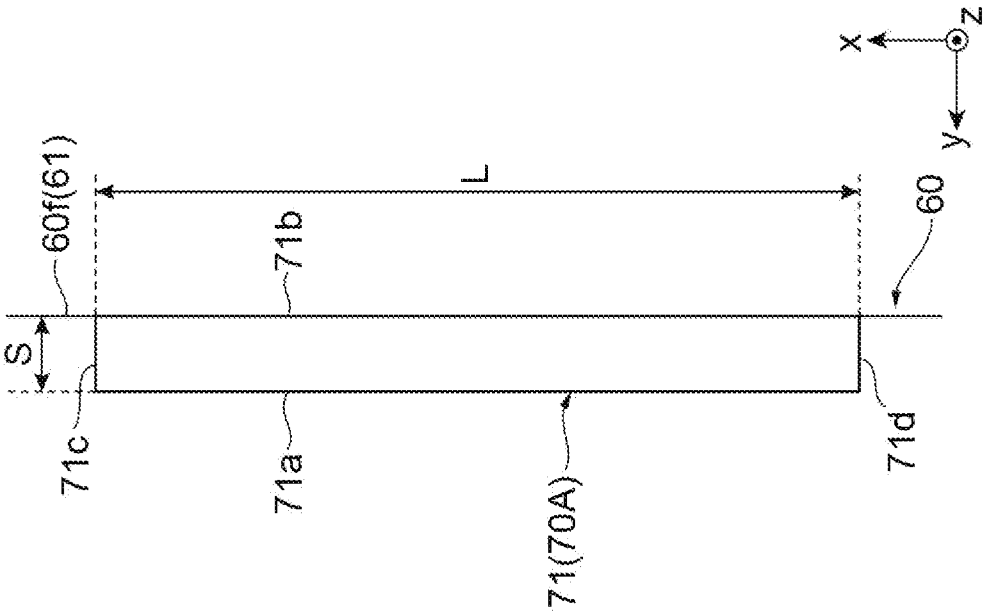

The side surface conductors 70A and 70B will be described in more detail with reference to FIGS. 7, 8A and 8B. FIG. 7 is an enlarged cross-sectional view taken along line VII-VII illustrated in FIG. 6B. FIGS. 8A and 8B are plan views illustrating conductor patterns 71 of the first side surface conductor 70A. Note that, although FIGS. 7, 8A and 8B illustrate only the first side surface conductor 70A on the negative side in the y direction, the first side surface conductor 70A on the positive side in the y direction also has the same configuration. Furthermore, the second side surface conductor 70B also employs the same configuration as that of the first side surface conductor 70A.

As illustrated in FIG. 7, the first side surface conductor 70A is formed by laminating a plurality of the conductor patterns 71 in the z direction. The conductor pattern 71 is a flat conductor that expands in parallel with the xy plane. The conductor pattern 71 per sheet has a rectangular shape having the longitudinal direction in the x direction in plan view (see FIGS. 8A and 8B). The conductor pattern 71 has end parts 71*a* and 71*b* in the y direction and end parts 71*c* and 71*d* in the x direction. The end parts 71*a* and 71*b* oppose to each other in the y direction, the end part 71*a* is disposed on the positive side in the y direction, and the end part 71*b* is disposed on the negative side in the y direction. The end parts 71*c* and 71*d* oppose to each other in the x direction, the end part 71*c* is disposed on the positive side in the x direction, and the end part 71*d* is disposed on the negative side in the x direction. The plurality of conductor patterns 71 are laminated overlapping in the z direction such that the four end parts 71*a*, 71*b*, 71*c*, and 71*d* coincide with each other. A material of the dielectric layer 60 is interposed between the pair of conductor patterns 71.

The first side surface conductor 70A is formed by laminating the plurality of conductor patterns 71 in a region from the radiation conductor 10A to the ground conductor G2. The conductor pattern 71 on the uppermost side (the positive side in the z direction) of the first side surface conductor 70A constitutes an edge 70*b* on an upper side of the first side surface conductor 70A. The conductor pattern 71 on the uppermost side may be disposed at the same position as that of the radiation conductor 10A in the z direction, or may be disposed at a position higher than that of the radiation conductor 10A. The conductor pattern 71 on the lowermost side (the negative side in the z direction) of the first side surface conductor 70A constitutes the edge 70*a* on a lower side of the first side surface conductor 70A. The conductor pattern 71 on the lowermost side may be disposed at the same position as that of the ground conductor G2 in the z direction, or may be disposed at a position lower than that of the ground conductor G2.

As illustrated in FIGS. 7 and 8A, the end part 71*b* of the conductor pattern 71 on the outer side in the y direction may be disposed at the same position as that of the side surface 60*f* of the dielectric layer 60. In this case, the first side surface conductor 70A is exposed from the side surface 60*f* of the dielectric layer 60. Alternatively, as illustrated in FIG. 8B, the end part 71*b* of the conductor pattern 71 on the outer side in the y direction may be spaced away from the side surface 60*f* of the dielectric layer 60 toward the inner side in the y direction. In this case, the side surface conductor 70A is not exposed from the side surface 60*f*.

A dimensional relationship of the side surface conductor 70 will be described. As illustrated in FIG. 7, a pitch Z between the conductor patterns 71 may be set to 0.02 to 0.2 mm. The number of the laminated conductor patterns 71 may be set to 20 to 50. Furthermore, the thickness of the conductor pattern 71 may be set to 0.005 to 0.05 mm. As illustrated in FIGS. 8A and 8B, a dimension L of the first side surface conductor 70A in the x direction may be set to 3 to 5 mm. A dimension S of the first side surface conductor 70A in the y direction may be set to 0.05 to 0.3 mm. A dimension B of separation of the end part 71*b* of the conductor pattern 71 on the outer side in the y direction and the side surface 60*f* of the dielectric layer 60 may be set to 0 to 0.1 mm.

The side surface conductor 70 is not connected with the ground conductor G2. That is, the ground conductor G2 does not extend to the side surface 60*f*, and is not electrically connected with the first side surface conductor 70A.

As illustrated in FIG. 6B, the plurality of antenna devices 1 are disposed such that the side surface conductors 70 thereof face each other. The antenna device 1 on the positive side in the y direction includes the side surface conductors 70A and 70B on the side surface 60*f* on the negative side in the y direction. The antenna device 1 on the negative side in the y direction includes the side surface conductors 70A and 70B on the side surface 60*e* on the positive side in the y direction. The side surface conductors 70A and 70B of the side surface 60*f* of the antenna device 1 on the positive side in the y direction, and the side surface conductors 70A and 70B on the side surface 60*e* of the antenna device 1 on the negative side in the y direction face each other in the y direction.

Next, functions and effects of the antenna device 1 and the antenna module 100 according to the present embodiment will be described.

The antenna device 1 according to the present embodiment includes the dielectric layer 60, the radiation conductors 10A and 10B and the ground conductor G2 disposed at the dielectric layer 60, and the side surface conductors 70 in which the plurality of conductor patterns 71 are laminated, the side surface conductors 70 are disposed on the outer side of the ground conductor G2 in the y direction in plan view seen from the normal direction of the radiation conductors 10A and 10B, and the dimensions L of the side surface conductors 70 in the x direction perpendicular to the y direction are larger than the dimensions of the radiation conductors 10A and 10B in the x direction.

The side surface conductors 70 are disposed on the outer side of the ground conductor G2 in the y direction, so that the side surface conductors 70 can prevent electromagnetic coupling with the adjacent antenna device 1. The dimension L of the side surface conductor 70 in the x direction is larger than dimensions of the radiation conductors 10A and 10B in the x direction. Consequently, the side surface conductor 70 having a sufficient size with respect to the radiation conductors 10A and 10B can prevent electromagnetic coupling with the adjacent antenna device 1. As described above, it is possible to improve radiation efficiency of the antenna device 1.

The first distance L1 between the radiation conductors 10A and 10B and the first end parts 61 of the dielectric layer 60 in the y direction may be shorter than the second distance L2 between the radiation conductors 10A and 10B and the second end parts 62 of the dielectric layer 60 in the x direction perpendicular to the y direction. Hence, the first end parts 61 in the y direction have a shorter distance to the radiation conductors 10A and 10B. In this y direction, the side surface conductors 70 are disposed on the outer side of the ground conductor G2, so that the side surface conductor 70 can prevent electromagnetic coupling with the adjacent antenna device 1.

The side surface conductors 70 may be disposed on both of the outer sides of the ground conductor G2 in the y direction. In this case, it is possible to improve radiation efficiency in a wide band as compared with the antenna device 1 (see FIG. 17) in which the side surface conductors 70 are disposed only on one side in the y direction.

The dimension of the side surface conductor 70 in the x direction may be ½ or more of the wavelength of the radio wave that propagates in the dielectric layer 60. In this case, it is possible to sufficiently secure the size of the side surface conductor 70.

The antenna device 1 may include the plurality of columnar conductors 51 disposed around the radiation conductors 10A and 10B in plan view seen from the normal direction of the radiation conductors 10A and 10B, and both edges of the side surface conductor 70 in the x direction may be located on the inner side of the columnar conductors located at both ends of the plurality of columnar conductors 51 in the x direction. In this case, it is possible to improve the radiation efficiency of the antenna device 1 by preventing the side surface conductors 70 from becoming larger more than necessary.

The side surface conductor 70 may be formed by laminating the conductor patterns 71 in the region from the radiation conductors 10A and 10B to the ground conductor G2. In this case, the side surface conductors 70 can be disposed at positions corresponding to portions from which signals are emitted.

The side surface conductors 70 may be exposed from the dielectric layer 60. In this case, the side surface conductors 70 can be brought as close as possible to the adjacent antenna devices 1, so that it is possible to prevent electromagnetic coupling.

The side surface conductors 70 may not be connected with the ground conductor G2. In this case, it is possible to suppress a decrease in radiation efficiency caused by connecting the side surface conductors 70 with the ground conductor G2.

The radiation conductor 10 includes the radiation conductors 10A and 10B disposed side by side in the y direction, the side surface conductor 70 includes the first side surface conductor 70A disposed on the outer side of the radiation conductor 10A and the second side surface conductor 70B disposed on the outer side of the radiation conductor 10B, and the first side surface conductor 70A and the second side surface conductor 70B may be spaced away from each other. In this case, it is possible to prevent the side surface conductors 70 from becoming larger more than necessary, and improve the radiation efficiency.

The antenna module 100 according to the present embodiment may include the plurality of above-described antenna devices 1, and the plurality of antenna devices 1 may be disposed such that the side surface conductors 70 thereof face each other. In this case, the facing side surface conductors 70 can prevent electromagnetic coupling between the adjacent antenna devices 1, and improve radiation efficiency in a wide band.

Figure 9C:
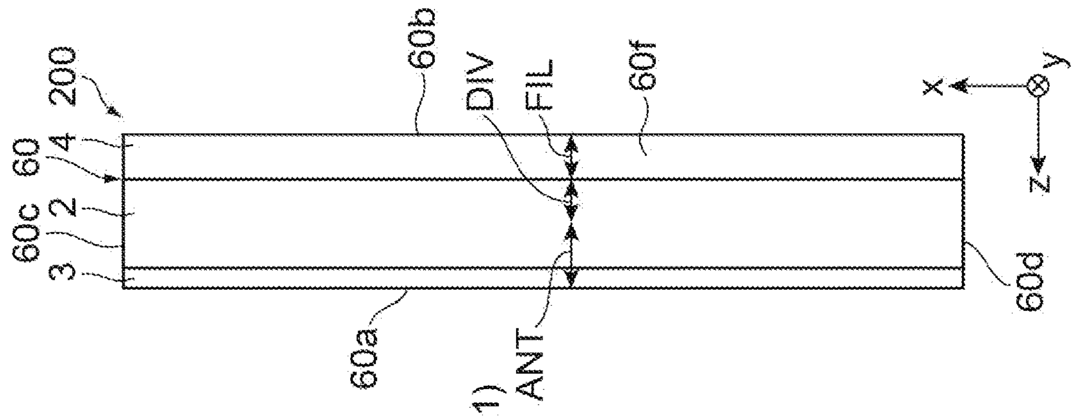
FIGS. 9A to 9C are views each illustrating an antenna device according to a comparative example.
Figure 9B:
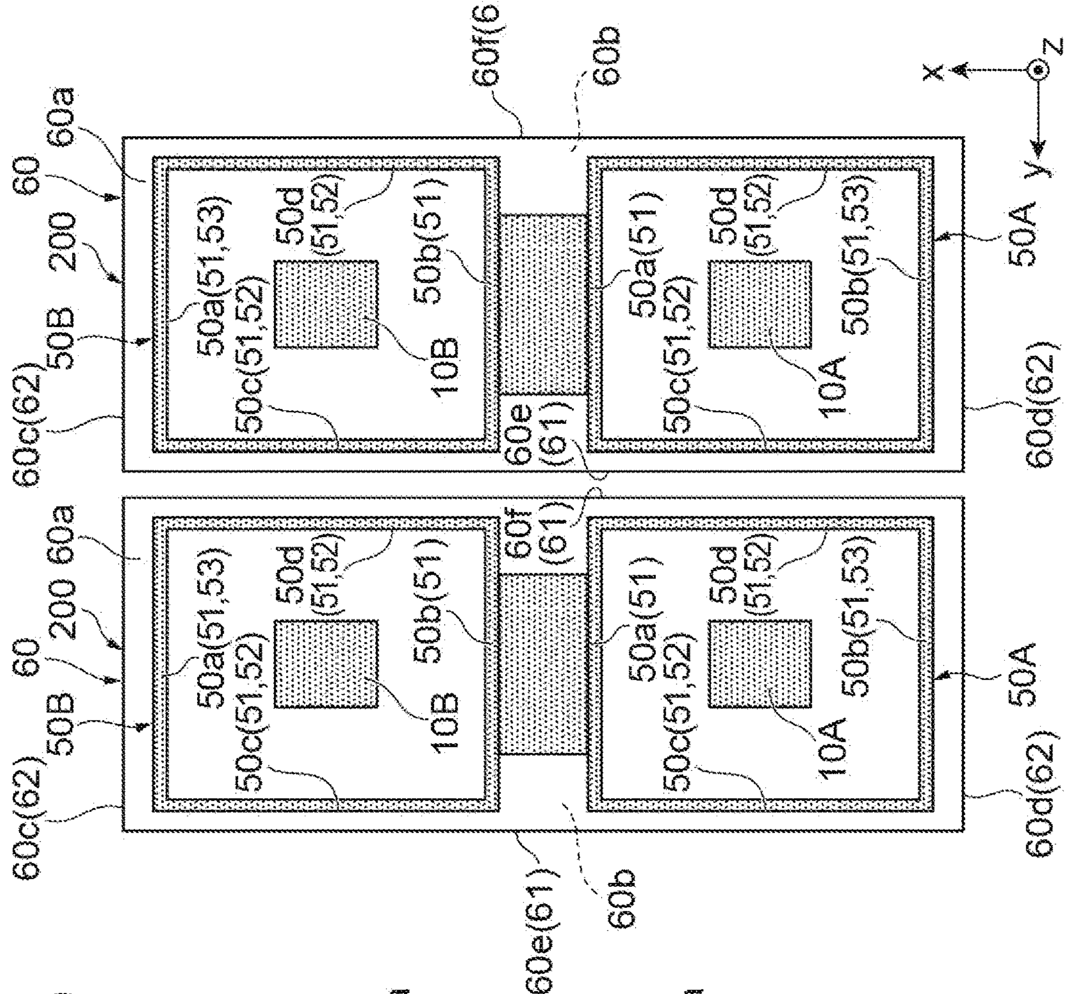
Figure 9A:
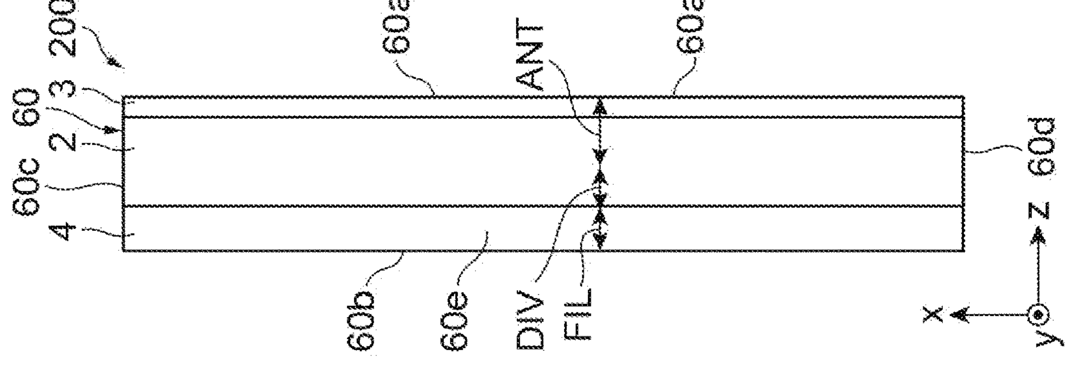
Figure 10A:
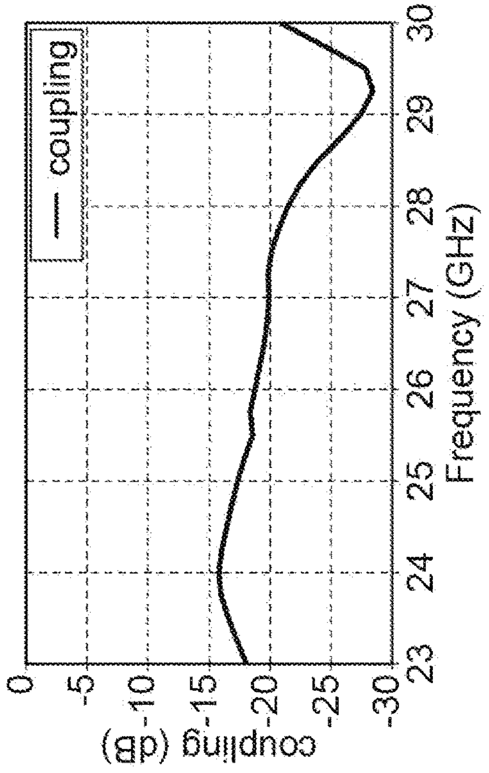
FIGS. 10A to 10C are graphs showing simulation results of the antenna device according to the comparative example.
Figure 10B:
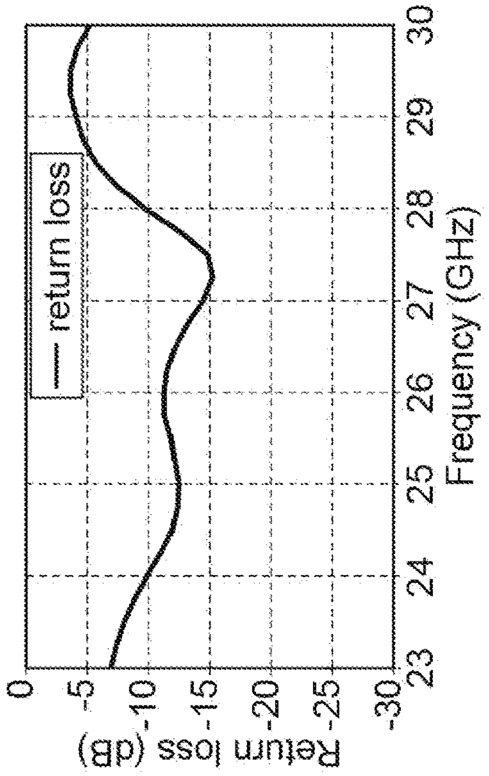
Figure 10C:
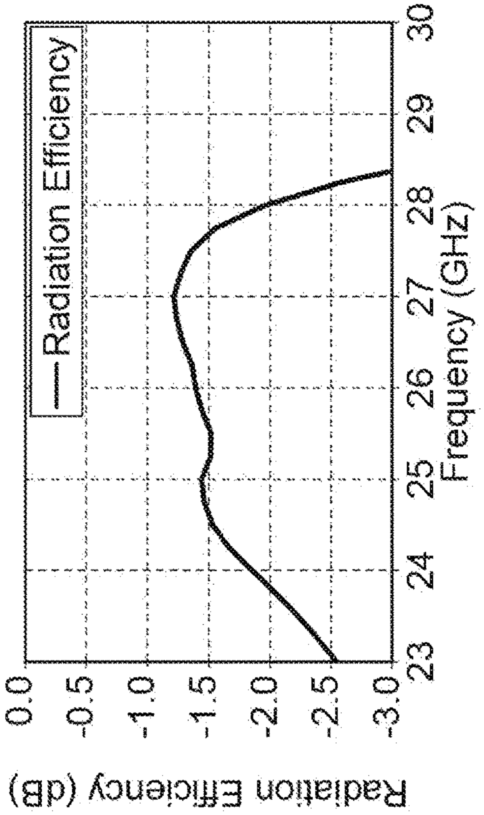

Here, an antenna device 200 according to a comparative example will be described with reference to FIGS. 9A to 9C. The antenna device 200 differs from the antenna device 1 illustrated in FIGS. 6A to 6C in that the antenna device 200 does not include the side surface conductors 70. An antenna module in which the three antenna devices 200 were aligned in the y direction was created, and the antenna module was adjusted at a frequency of 24.25 to 27.5 GHz to obtain characteristics related to "Pol V" by electromagnetic field simulation. Simulation results are shown in FIGS. 10A to 10C. In the antenna device 200 according to the comparative example, "coupling" with adjacent antennas is stronger. Hence, it was confirmed that "radiation efficiency" lowered around 25 GHZ. Although it is desirable to insert a shield into a gap between the antenna devices 1 in the antenna module, there is a problem that it is difficult to dispose the shield because the gap is narrow.

Figure 11A:
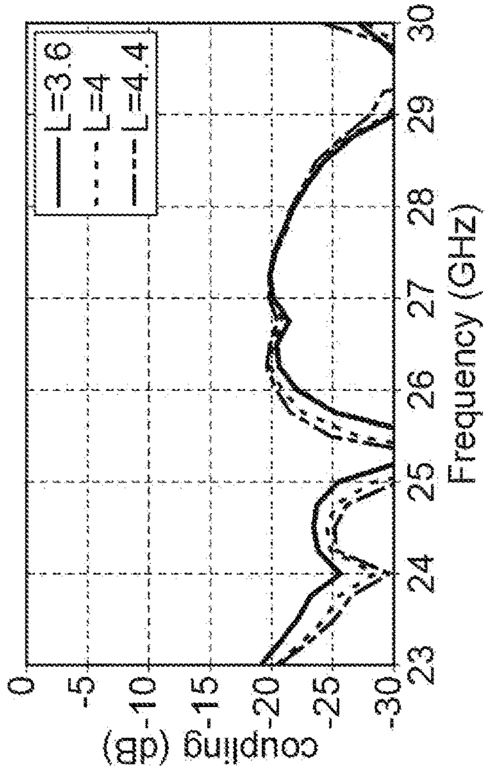
FIGS. 11A to 11C are graphs showing simulation results according to an Example.
Figure 11B:
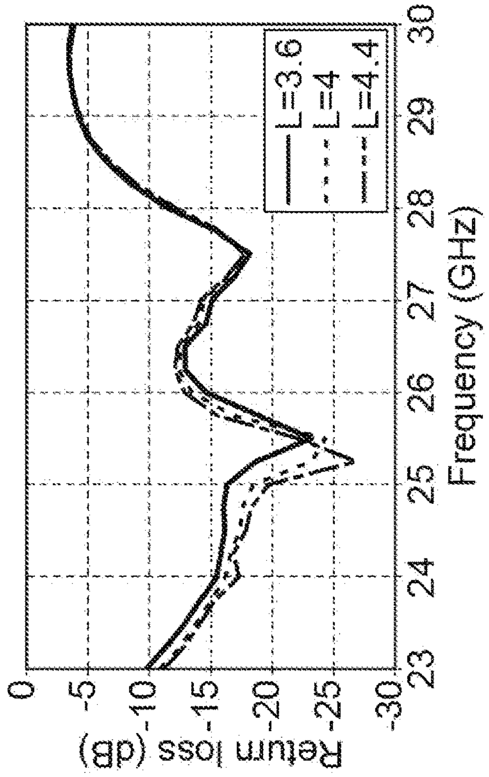
Figure 11C:
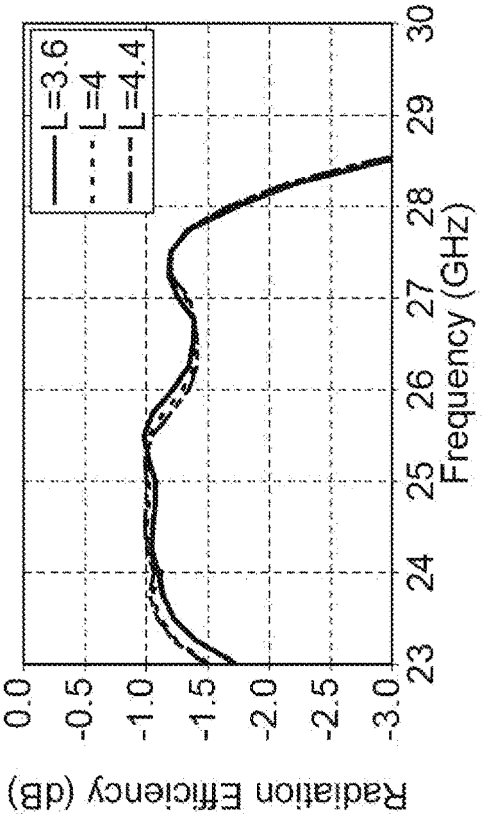

By contrast with this, simulation results of an antenna module in which the three antenna devices 1 illustrated in FIGS. 6A to 6C were aligned are shown in FIGS. 11A to 16C. FIGS. 11A to 11C show the simulation results obtained when the dimension L of the side surface conductor 70 in the x direction was adjusted. Note that, unless otherwise specified, the following simulations assume the conditions of "dimension L=4 mm", "dimension S=0.18 mm", "dimension B=0 mm", "the number N of conductor patterns=33", and "pitch Z of conductor patterns=0.04 mm". As illustrated in FIGS. 11A to 11C, "coupling" of "Pol V" lowers at 23 to 26 GHz as compared with the result in FIGS. 9A to 9C according to the comparative example. Consequently, it is possible to confirm that "radiation efficiency" increases. Furthermore, it is possible to confirm that, as the dimension L increases, the frequency at which "coupling" lowers decreases. Furthermore, as illustrated in FIG. 11B, it was possible to reduce "return loss" as compared with the result in FIGS. 9A to 9C according to the comparative example.

Figure 12B:
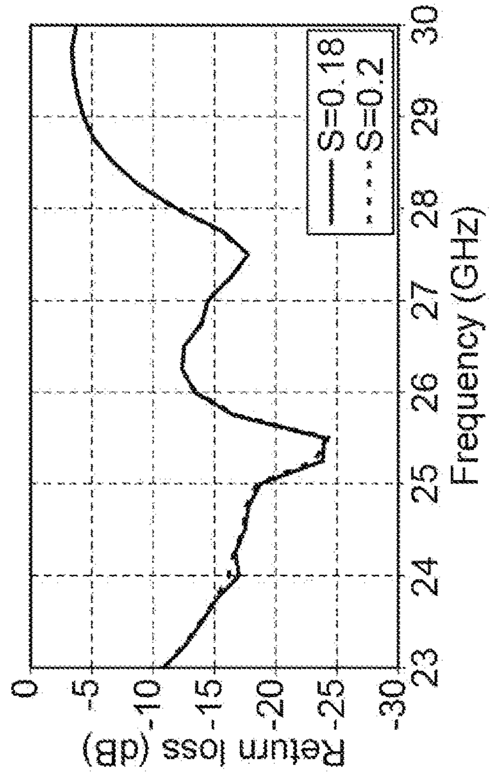
FIGS. 12A to 12C are graphs showing simulation results according to the Example.
Figure 12A:
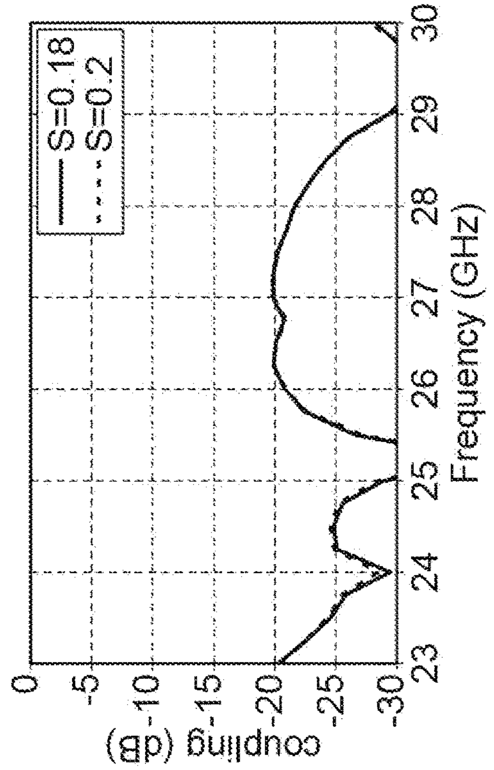
Figure 12C:
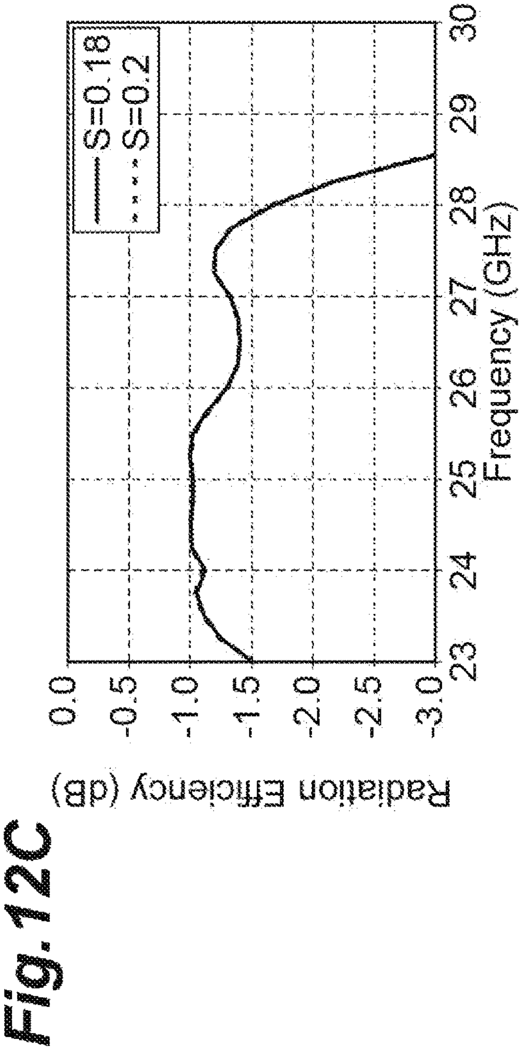

FIGS. 12A to 12C show the simulation results obtained when the dimension of the side surface conductor 70 in the y direction was adjusted. It is possible to confirm from FIGS. 12A to 12C that the length of the dimension S does not depend on "coupling" or "radiation efficiency". The size of the dimension S may be set to an appropriate size that does not cause collision with other electrodes or the like and does not cause any problem in manufacturing.

Figure 13A:
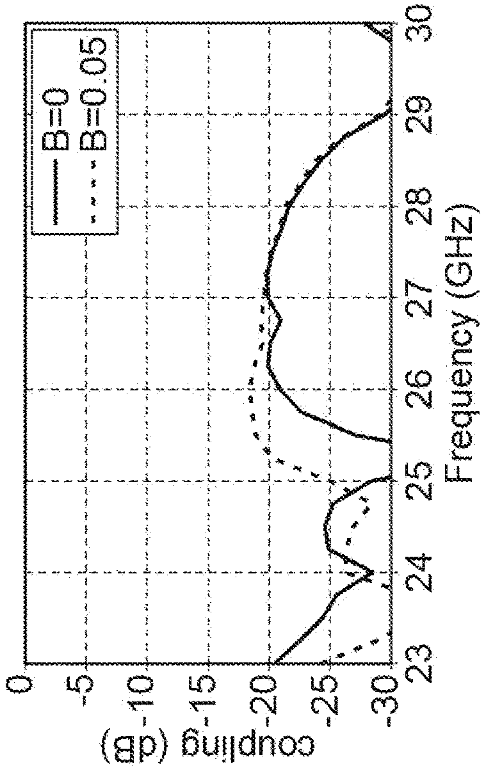
FIGS. 13A to 13C are graphs showing simulation results according to the Example.
Figure 13B:
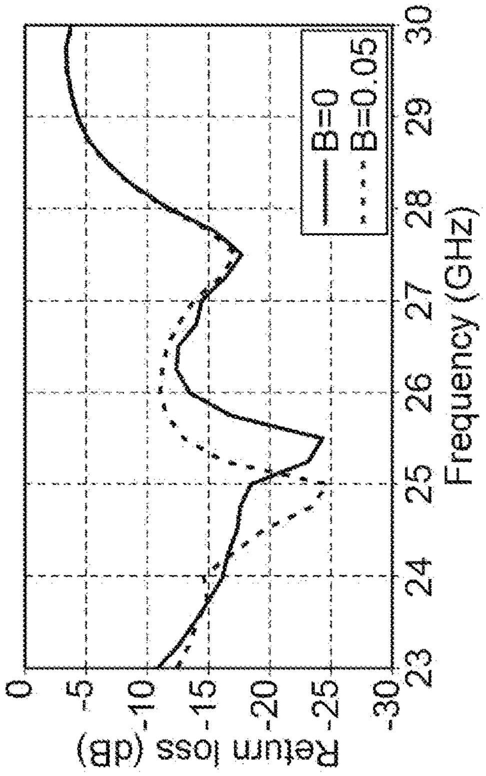
Figure 13C:
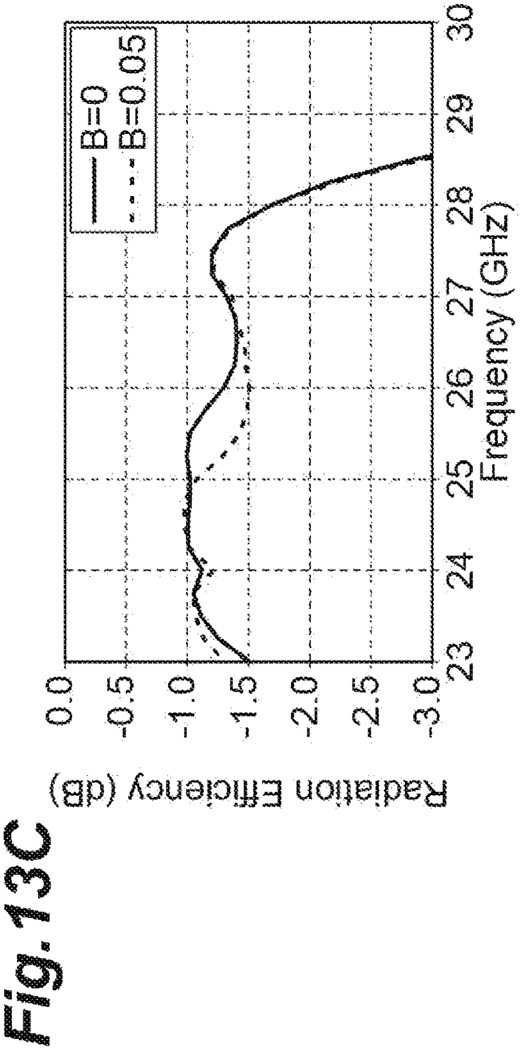

FIGS. 13A to 13C show the simulation results obtained when the dimension B of separation of the side surface conductor 70 from the side surfaces 60*e* and 60*f* of the dielectric layer 60 was adjusted. It is possible to confirm that, when the dimension B is as small as possible, "coupling" and "radiation efficiency" improve. As described above, by making the distance to the side surface conductors 70 of the adjacent antenna device 1 as short as possible, it is possible to improve "coupling", "radiation efficiency", and "return loss".

Figure 14A:
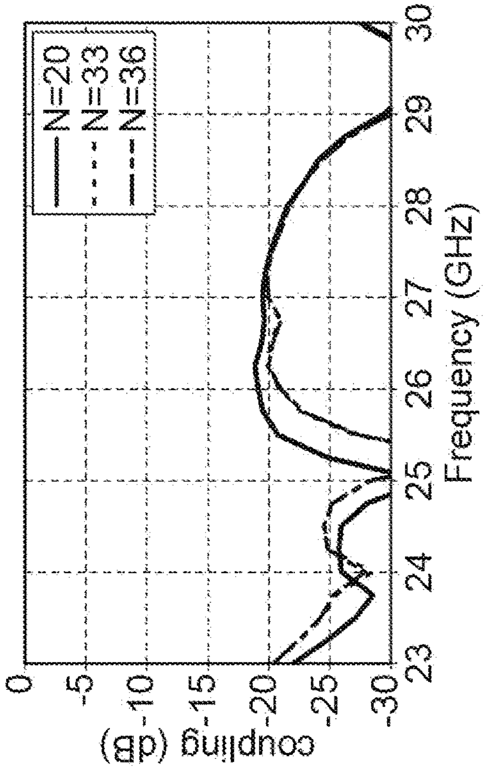
FIGS. 14A to 14C are graphs showing simulation results according to the Example.
Figure 14B:
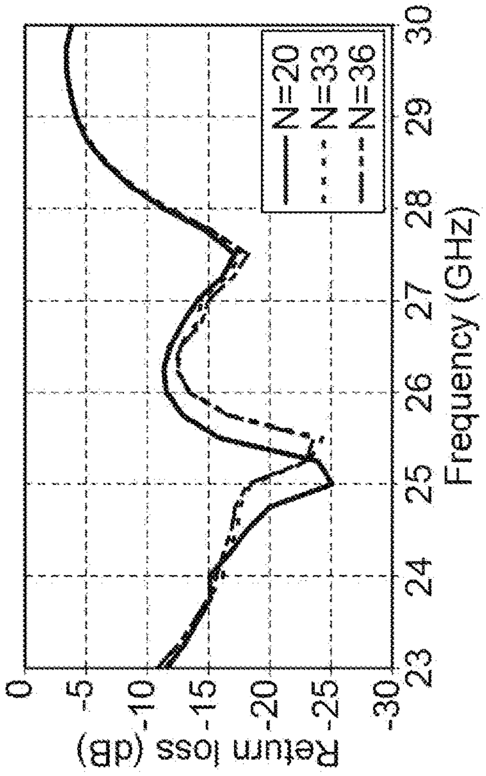
Figure 14C:
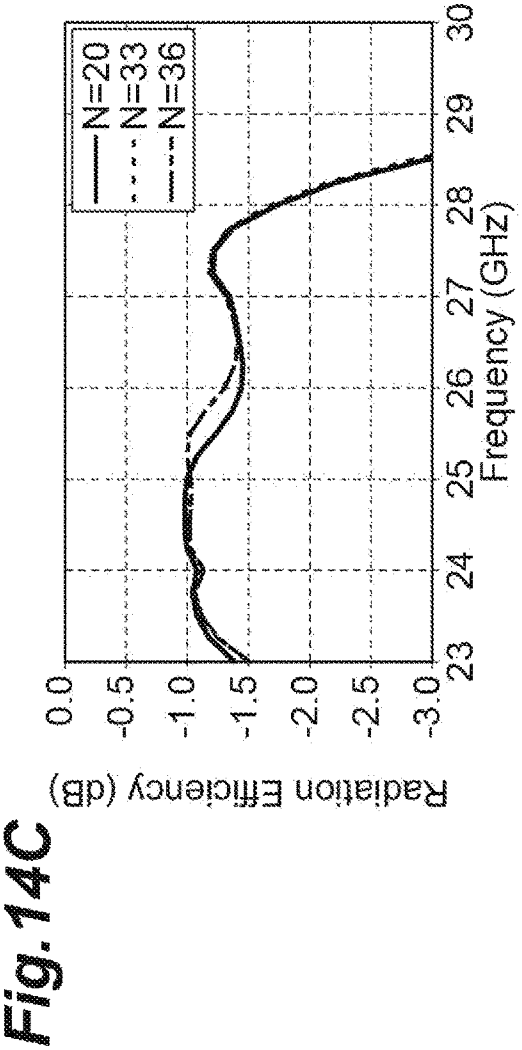

FIGS. 14A to 14C show the simulation results obtained when the number N of the conductor patterns 71 of the side surface conductors 70 was adjusted. When the number N is such a quantity that the side of the antenna layer ANT is covered, it is possible to improve "coupling", "radiation efficiency", and "return loss".

Figure 15B:
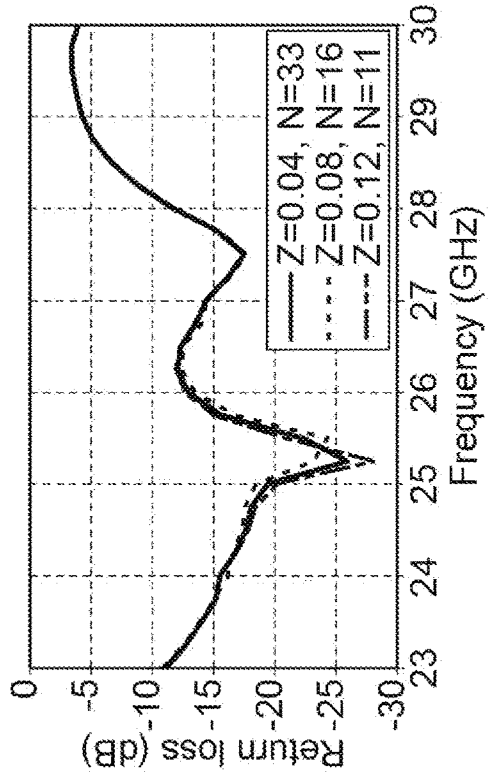
FIGS. 15A to 15C are graphs showing simulation results according to the Example.
Figure 15A:
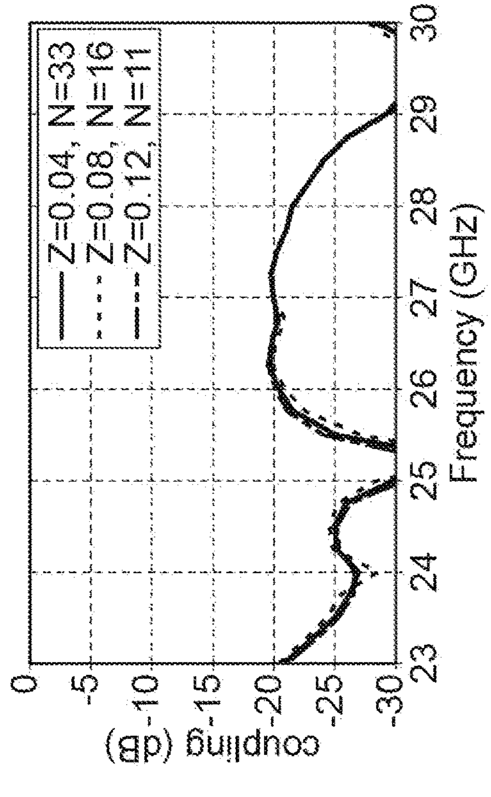
Figure 15C:
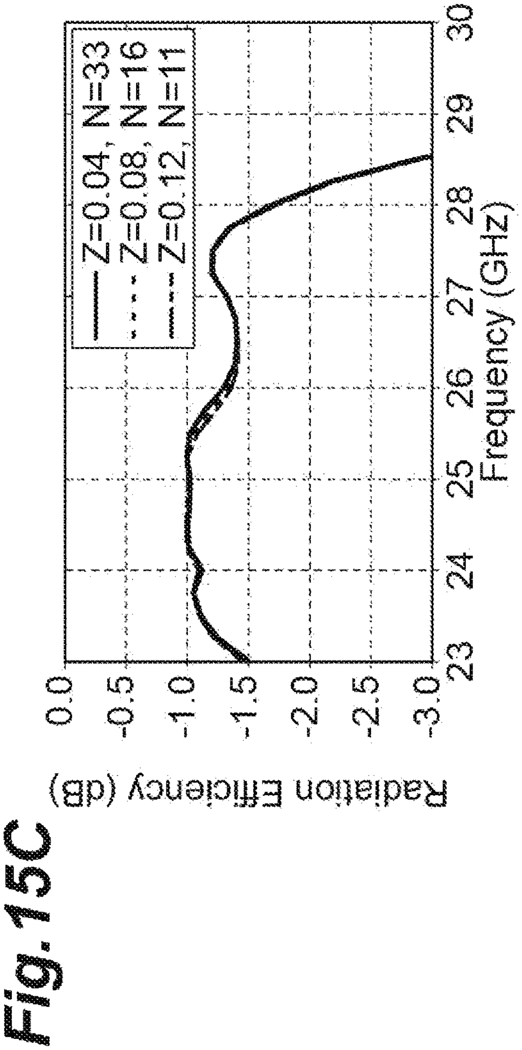

FIGS. 15A to 15C show the simulation results obtained when the pitch Z of the conductor patterns 71 of the side surface conductor 70 was adjusted. It is possible to confirm that, as the pitch Z becomes as small as possible, the frequency range in which deterioration of the "radiation efficiency" is suppressed becomes wider.

Figure 16B:
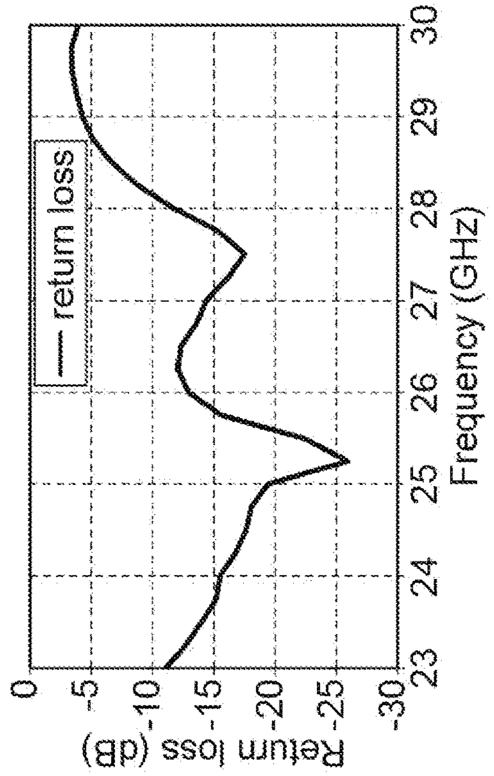
FIGS. 16A to 16C are graphs showing simulation results according to the Example.
Figure 16A:
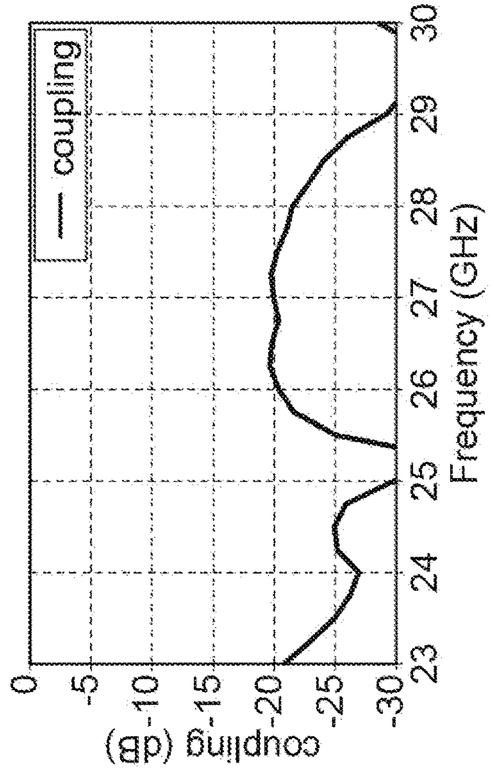
Figure 16C:
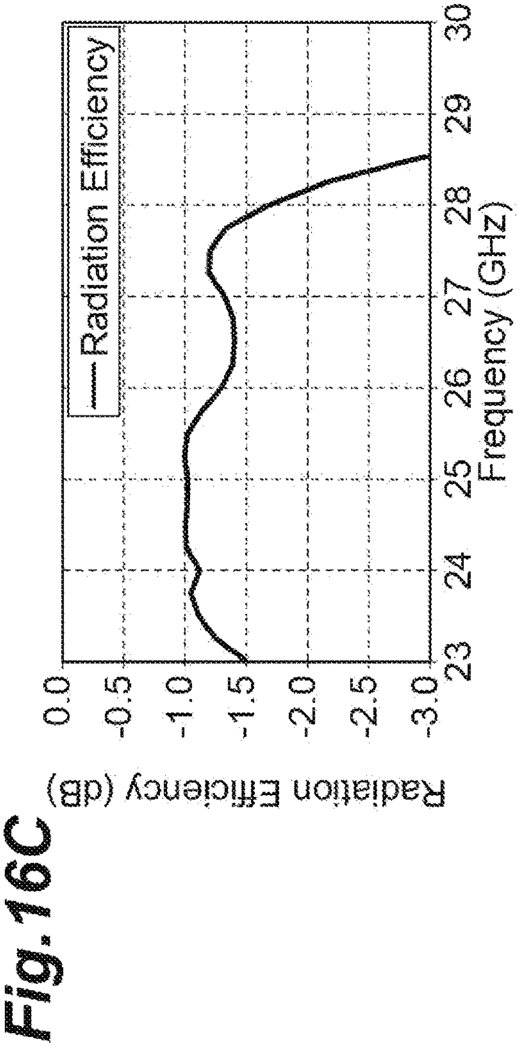

FIGS. 16A to 16C show the simulation result of the antenna device 1 illustrated in FIGS. 6A to 6C under the conditions of "dimension L=4 mm", "dimension S=0.18 mm", "dimension B=0 mm", "the number N of conductor patterns=33", and "pitch Z of conductor patterns=0.04 mm". It is possible to confirm that this structure improves "coupling", "radiation efficiency", and "return loss" of V polarization.

The present disclosure is not limited to the above-described embodiment.

Figure 17:
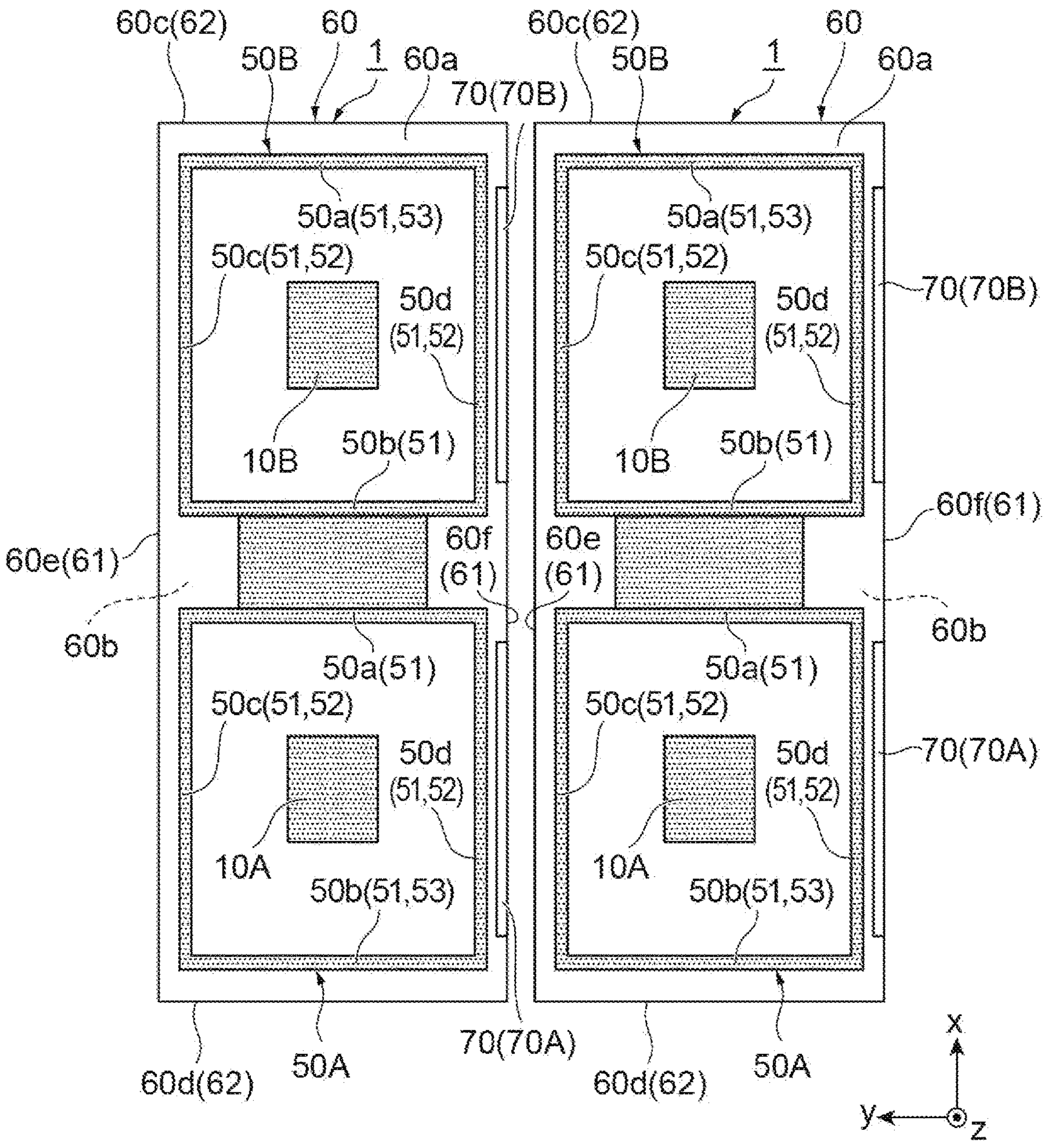
FIG. 17 is a view illustrating an antenna device according to a modification.
Figure 18A:
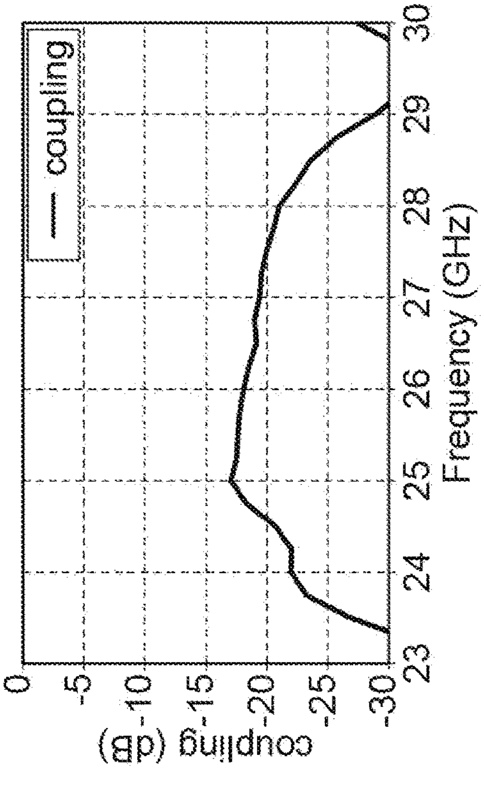
FIGS. 18A to 18C are graphs showing simulation results.
Figure 18B:
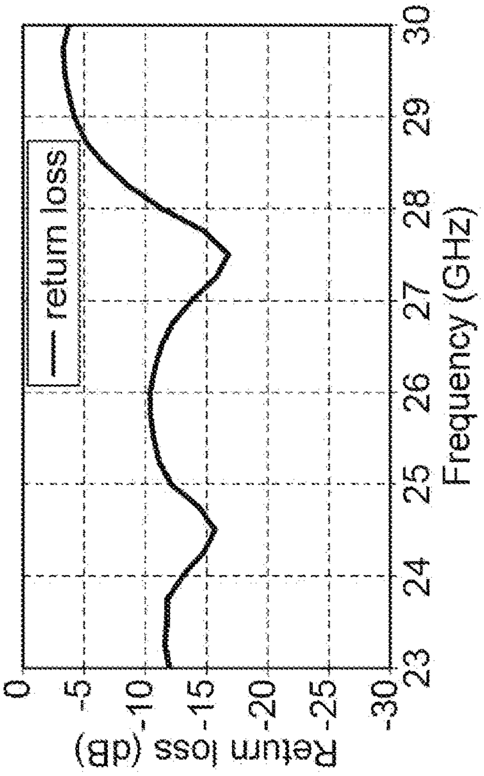
Figure 18C:
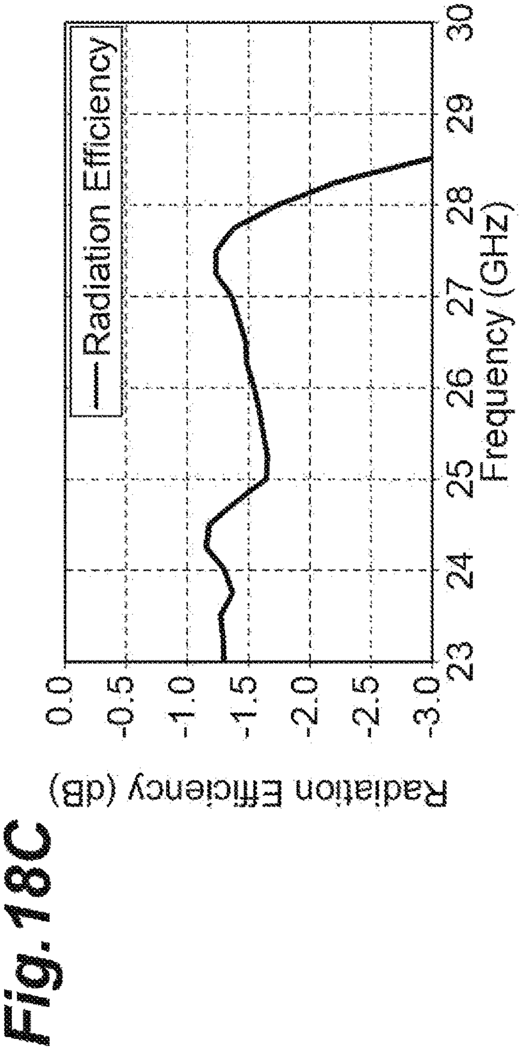

For example, the antenna device 1 illustrated in FIG. 17 may be adopted. In the antenna device 1 illustrated in FIG. 17, the side surface conductors 70 are disposed only on one side in the y direction. FIGS. 18A to 18C show the simulation results of an antenna module in which the three antenna devices 1 illustrated in FIG. 17 were aligned. As illustrated in FIGS. 18A to 18C, good results were obtained for each characteristic as compared with the results in FIGS. 9A to 9C according to the comparative example. In particular, "radiation efficiency" improved. Furthermore, it is possible to confirm that the performance is improved by providing the side surface conductors 70 on both sides in the y direction as illustrated in FIGS. 6A to 6C as compared with the case where the side surface conductors 70 are provided only on one side in the y direction. In particular, the antenna device 1 in FIGS. 6A to 6C has improved "coupling" as compared with the result in FIGS. 18A to 18C.

Figure 19:
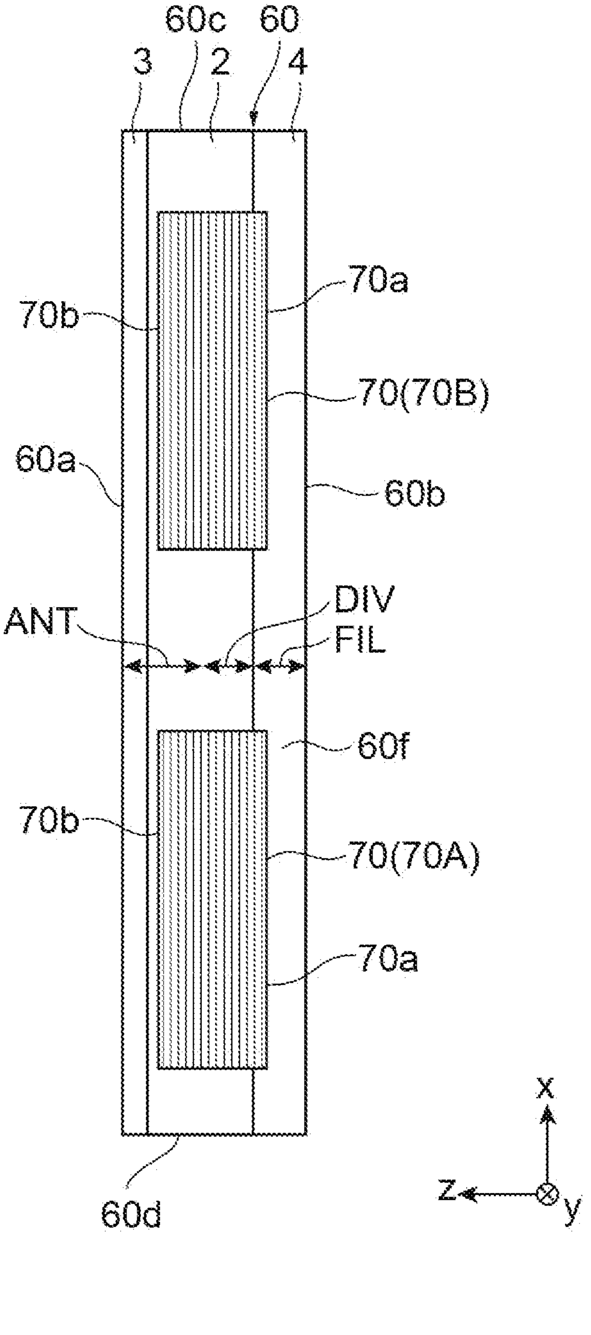
FIG. 19 is a view illustrating an antenna device according to the modification.

The positions of the edges 70*a* on the lower side and the edges 70*b* on the upper side of the side surface conductors 70A and 70B are not limited to those of the above-described embodiment. For example, the antenna device 1 illustrated in FIG. 19 may be adopted. In the antenna device 1 illustrated in FIG. 19, the side surface conductors 70 are disposed on the lower side as compared with the side surface conductor 70 illustrated in FIGS. 6A to 6C as a whole. The edge 70*a* on the lower side is disposed at a position overlapping the filter layer FIL. Furthermore, the edge 70*b* on the upper side is disposed at a position overlapping the first dielectric layer 2.

Figure 20:
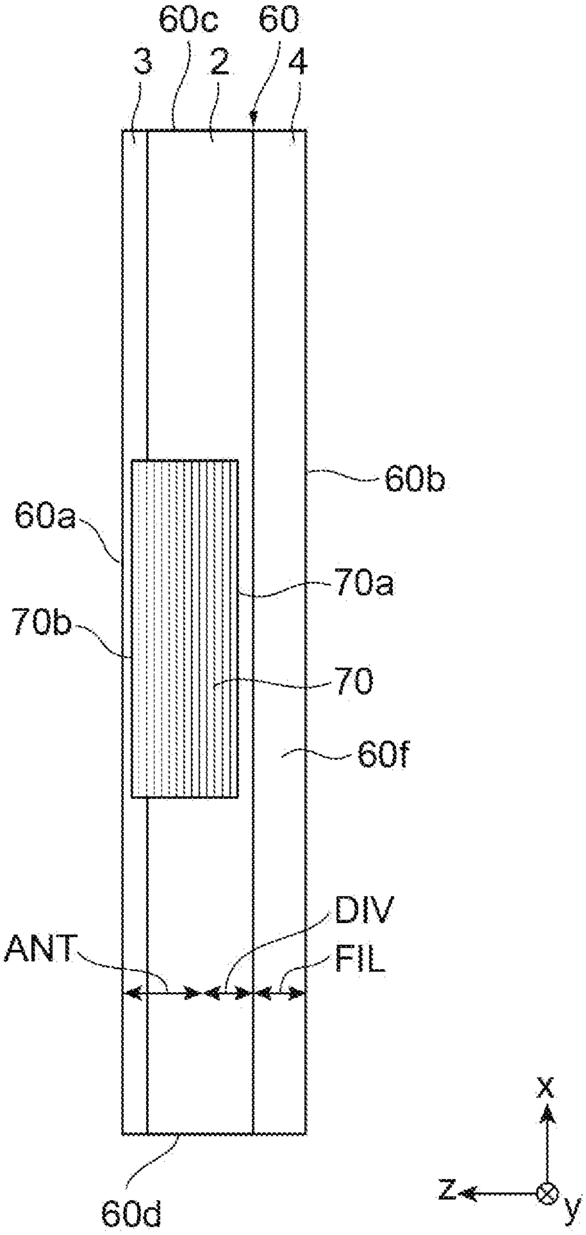
FIG. 20 is a view illustrating the antenna device according to the modification.
Figure 21:
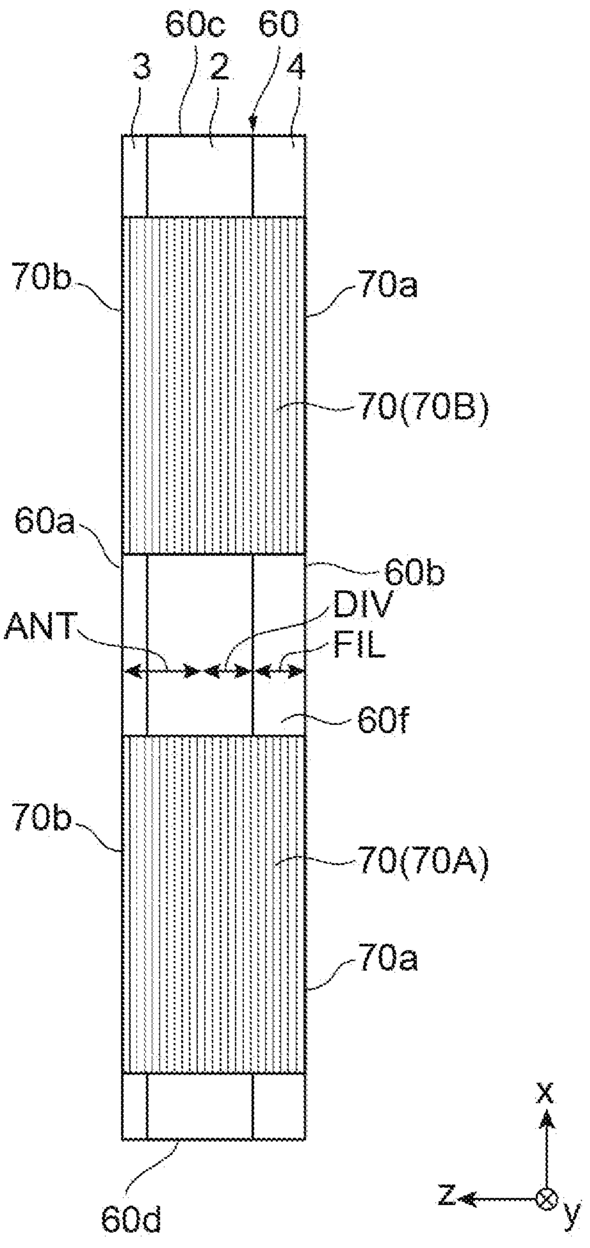
FIG. 21 is a view illustrating the antenna device according to the modification.

As illustrated in FIG. 20, the one side surface conductor 70 may be disposed at the center position of the dielectric layer 60 in the x direction. Furthermore, the antenna device 1 illustrated in FIG. 21 may be adopted. In the antenna device 1 illustrated in FIG. 21, the edge 70*a* on the lower side of the side surface conductor 70 reaches the bottom surface 60*b* of the dielectric layer 60, and the edge 70*b* on the upper side reaches the top surface 60*a* of the dielectric layer 60.

The technique according to the present disclosure includes the following configuration examples, yet is not limited thereto.

Aspect 1

An antenna device includes:
- a dielectric layer;
- a radiation conductor and a ground conductor disposed at the dielectric layer; and
- a side surface conductor in which a plurality of conductor patterns are laminated,
- the side surface conductor is disposed on an outer side of the ground conductor in a first direction in plan view seen from a normal direction of the radiation conductor, and
- a dimension of the side surface conductor in a second direction perpendicular to the first direction is larger than a dimension of the radiation conductor in the second direction.

Aspect 2

In the antenna device according to aspect 1, a first distance between the radiation conductor and a first end part of the dielectric layer in the first direction is shorter than a second distance between the radiation conductor and a second end part of the dielectric layer in the second direction.

Aspect 3

In the antenna device according to aspect 1 or 2, the side surface conductor is disposed on both outer sides of the ground conductor in the first direction.

Aspect 4

In the antenna device according to any one of aspects 1 to 3, the dimension of the side surface conductor in the second direction is ½ or more of a wavelength of a radio wave that propagates in the dielectric layer.

Aspect 5

The antenna device according to any one of aspects 1 to 4 further includes a plurality of columnar conductors disposed around the radiation conductor in plan view seen from the normal direction of the radiation conductor, and
- both edges of the side surface conductor in the second direction are located on an inner side of the columnar conductors located at both ends of the plurality of columnar conductors in the second direction.

Aspect 6

In the antenna device according to any one of aspects 1 to 5, the side surface conductor is formed by laminating the conductor patterns in a region from the radiation conductor to the ground conductor.

Aspect 7

In the antenna device according to any one of aspects 1 to 6, the side surface conductor is exposed from the dielectric layer.

Aspect 8

In the antenna device according to any one of aspects 1 to 7, the side surface conductor is not connected with the ground conductor.

Aspect 9

In the antenna device according to any one of aspects 1 to 8,
- the radiation conductor includes first and second radiation conductors disposed side by side in the second direction, the side surface conductor includes a first side surface conductor disposed on an outer side of the first radiation conductor, and a second side surface conductor disposed on an outer side of the second radiation conductor, and
- the first side surface conductor and the second side surface conductor are spaced away from each other.

Aspect 10

An antenna module includes a plurality of the antenna devices according to any one of aspects 1 to 9, and
- the plurality of antenna devices are disposed such that the side surface conductors thereof face each other.

REFERENCE SIGNS LIST

1 antenna device
10 radiation conductor
10A radiation conductor (first radiation conductor)
10B radiation conductor (second radiation conductor)
13H, 13V power feeding conductor
14H, 14V power feeding conductor
50 ground conductor

51 columnar conductor
52 first columnar conductor
53 second columnar conductor
60 dielectric layer
70 side surface conductor
70A side surface conductor (first side surface conductor)
70B side surface conductor (second side surface conductor)
71 conductor pattern
ANT antenna layer
DIV distribution layer
FIL filter layer
G2 ground conductor

What is claimed is:

1. An antenna device comprising:
a dielectric layer;
a radiation conductor and a ground conductor disposed at the dielectric layer; and
a side surface conductor in which a plurality of conductor patterns are laminated, wherein
the side surface conductor is disposed on an outer side of the ground conductor in a first direction in plan view seen from a normal direction of the radiation conductor, and
a dimension of the side surface conductor in a second direction perpendicular to the first direction is larger than a dimension of the radiation conductor in the second direction.

2. The antenna device according to claim 1, wherein a first distance between the radiation conductor and a first end part of the dielectric layer in the first direction is shorter than a second distance between the radiation conductor and a second end part of the dielectric layer in the second direction.

3. The antenna device according to claim 1, wherein the side surface conductor is disposed on both outer sides of the ground conductor in the first direction.

4. The antenna device according to claim 1, wherein the dimension of the side surface conductor in the second direction is ½ or more of a wavelength of a radio wave that propagates in the dielectric layer.

5. The antenna device according to claim 1, further comprising a plurality of columnar conductors disposed around the radiation conductor in plan view seen from the normal direction of the radiation conductor, wherein
both edges of the side surface conductor in the second direction are located on an inner side of the columnar conductors located at both ends of the plurality of columnar conductors in the second direction.

6. The antenna device according to claim 1, wherein the side surface conductor is formed by laminating the conductor patterns in a region from the radiation conductor to the ground conductor.

7. The antenna device according to claim 1, wherein the side surface conductor is exposed from the dielectric layer.

8. The antenna device according to claim 1, wherein the side surface conductor is not connected with the ground conductor.

9. The antenna device according to claim 1, wherein
the radiation conductor includes first and second radiation conductors disposed side by side in the second direction,
the side surface conductor includes a first side surface conductor disposed on an outer side of the first radiation conductor, and a second side surface conductor disposed on an outer side of the second radiation conductor, and
the first side surface conductor and the second side surface conductor are spaced away from each other.

10. An antenna module comprising a plurality of the antenna devices according to claim 1, wherein
the plurality of antenna devices are disposed such that the side surface conductors thereof face each other.

* * * * *